(12) United States Patent
Nagatsu et al.

(10) Patent No.: US 12,066,754 B2
(45) Date of Patent: Aug. 20, 2024

(54) ROTATABLE OPERATION APPARATUS AND ELECTRONIC APPARATUS

(71) Applicant: CANON KABUSHIKI KAISHA, Tokyo (JP)

(72) Inventors: Sho Nagatsu, Kanagawa (JP); Jun Kamiya, Kanagawa (JP); Shogo Satomura, Kanagawa (JP); Yoshikazu Asai, Kanagawa (JP); Takahiro Akimoto, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 141 days.

(21) Appl. No.: 17/744,528

(22) Filed: May 13, 2022

(65) Prior Publication Data
US 2022/0373859 A1 Nov. 24, 2022

(30) Foreign Application Priority Data

May 21, 2021 (JP) ................................ 2021-085803

(51) Int. Cl.
*G03B 7/00* (2021.01)
*G01D 5/14* (2006.01)

(52) U.S. Cl.
CPC ................. *G03B 7/00* (2013.01); *G01D 5/14* (2013.01)

(58) Field of Classification Search
CPC ..... G01D 5/145; G01D 5/2451; G06F 3/0362
See application file for complete search history.

(56) References Cited

U.S. PATENT DOCUMENTS

| | | | | |
|---|---|---|---|---|
| 10,838,022 | B2* | 11/2020 | Naka | G01D 5/147 |
| 2019/0072412 | A1* | 3/2019 | Fuchigami | H01H 19/00 |
| 2022/0300026 | A1* | 9/2022 | Alzingre | G05G 1/08 |

FOREIGN PATENT DOCUMENTS

JP 2020-087672 A 6/2020

* cited by examiner

*Primary Examiner* — Noam Reisner
(74) *Attorney, Agent, or Firm* — Canon U.S.A., Inc. IP Division

(57) ABSTRACT

A rotatable operation apparatus includes a rotatable operation member, a magnet having alternately magnetized magnetic poles, first and second magnetic members respectively including first and second teeth, a body frame, and a detector. A magnetized direction of each magnetic pole is parallel to a predetermined axis about which the rotatable operation member rotates. The magnet has a ring shape and is configured to rotate about the predetermined axis as the rotatable operation member rotates. The rotatable operation apparatus generates an operation force according to a change in positions of the magnetic poles, caused by the rotation of the magnet, relative to positions of the first tooth and the second tooth. The magnet, the first magnetic member, and the second magnetic member are housed inside the body frame. When viewed from a thrust direction of the magnet, the detector is disposed at a position that does not overlap with the magnet.

18 Claims, 13 Drawing Sheets

ROTATABLE OPERATION APPARATUS AND ELECTRONIC APPARATUS

BACKGROUND

Field

The present disclosure relates to a rotatable operation apparatus and an electronic apparatus.

Description of the Related Art

Generally, an image pickup apparatus such as a digital camera, which is one of electronic apparatuses, is provided with a rotatable operation apparatus such as a dial with which an image pickup condition is set or various functions are selected. Japanese Patent Laid-Open No. ("JP") 2020-87672 discloses a rotatable operation apparatus that includes a disk-shaped permanent magnet in which S poles and N poles are alternately magnetized and a magnetic member having a radially formed plurality of comb teeth and generates an operation force by using a magnetic force during a rotational operation However, in the rotatable operation apparatus disclosed in JP 2020-87672, the magnet and the magnetic member are exposed to the outside, and therefore dustproof and dripproof performance is insufficient. In particular, in a case where the magnet is exposed to the outside, the magnet is likely to attract iron sand, etc., and if a large amount of iron sand, etc. adheres, operability may be impaired.

SUMMARY

The present disclosure provides a magnetic rotatable operation apparatus and an electronic apparatus each of which has excellent dustproof and drip-proof performance.

According to an aspect of the present disclosure, a rotatable operation apparatus includes a rotatable operation member configured to be rotatable about a predetermined axis, a base member configured to rotatably support the rotatable operation member, a magnet in which a plurality of magnetic poles are alternately magnetized and a magnetized direction of each of the plurality of magnetic poles is parallel to the predetermined axis, wherein the magnet has a ring shape and is configured to rotate about the predetermined axis as the rotatable operation member rotates, first and second magnetic members arranged so that each of the first and second magnetic members faces a magnetized surface of the magnet and the magnet is disposed between the first and second magnetic members, a body frame configured to hold the base member, and a detector configured to detect a change in a magnetic field caused by a rotation of the magnet, wherein the first magnetic member includes a first tooth and the second magnetic member includes a second tooth, wherein the rotatable operation apparatus is capable of generating an operation force according to a change in positions of the plurality of magnetic poles relative to positions of the first tooth and the second tooth, where the change in positions is caused by the rotation of the magnet, wherein the magnet, the first magnetic member, and the second magnetic member are housed inside the body frame, and wherein, in a view from a thrust direction of the magnet, the detector is disposed at a position that does not overlap with the magnet.

An electronic apparatus including the above rotatable operation apparatus also constitute another aspect of the embodiments.

Further features of the present disclosure will become apparent from the following description of exemplary embodiments with reference to the attached drawings.

DESCRIPTION OF THE EMBODIMENTS

Referring now to the accompanying drawings, a description is given of embodiments according to the present disclosure. In the following, a description is given of an image pickup apparatus, which is one of the electronic apparatuses, as an example, but the electronic apparatus is not limited to the image pickup apparatus, and the present disclosure can be applied to various electronic apparatuses including a rotatable operation apparatus.

First Embodiment

Figure 1A:
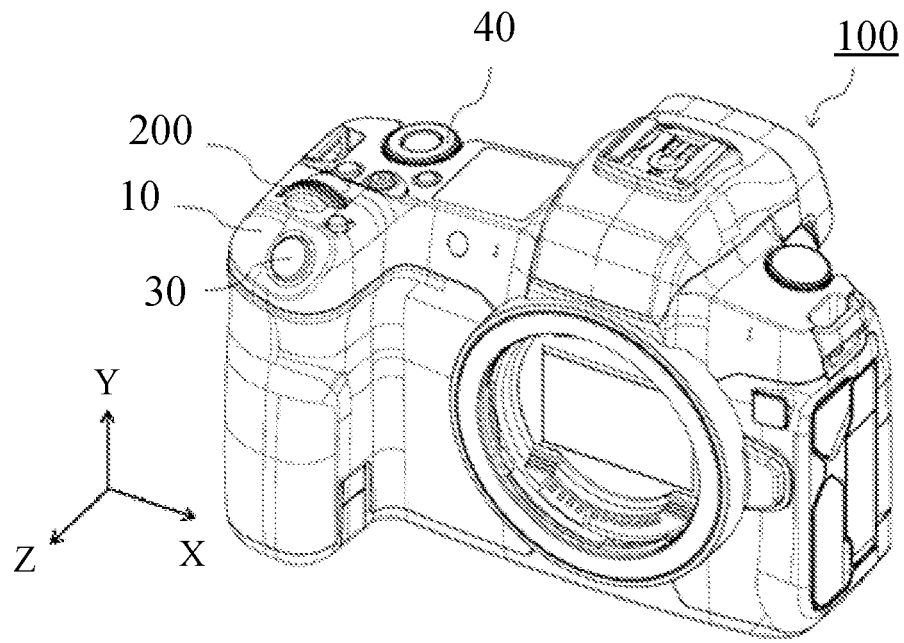
FIGS. 1A and 1B are perspective views of an image pickup apparatus according to a first embodiment.
Figure 1B:
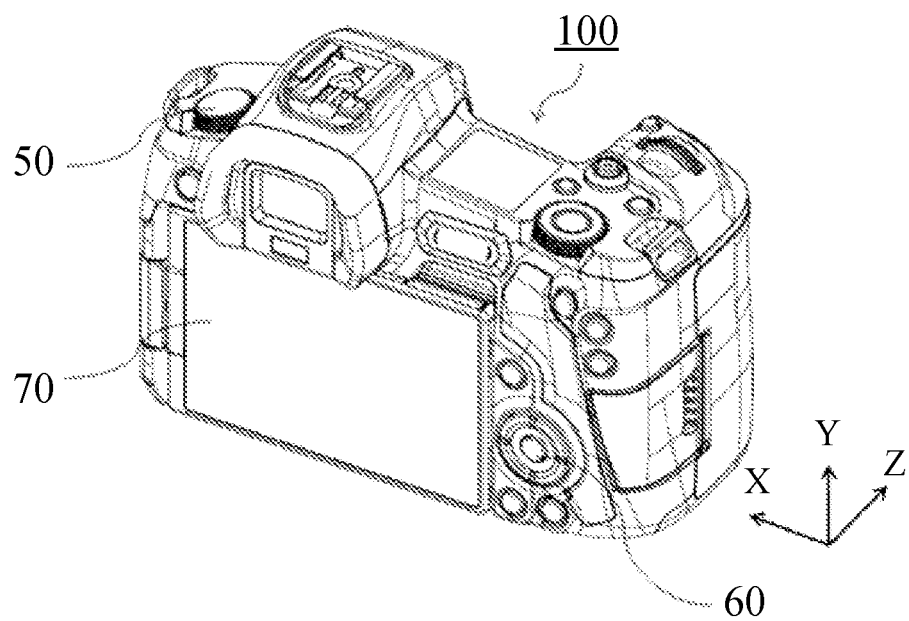
Figure 2:
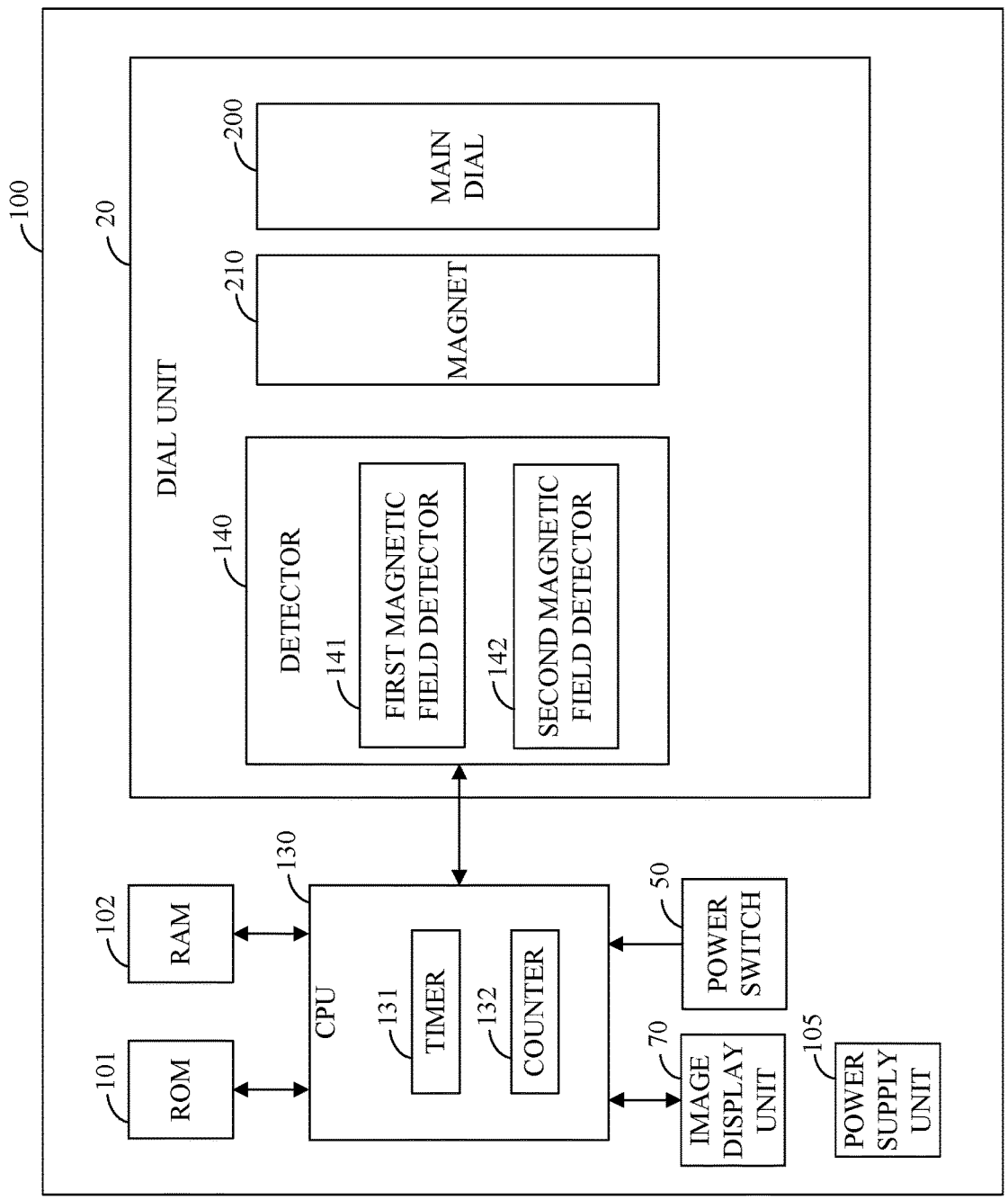
FIG. 2 is a block diagram of the image pickup apparatus according to the first embodiment.

First, a description is given of an image pickup apparatus (electronic apparatus) 100 according to the first embodiment of the present disclosure with reference to FIGS. 1A to 2. FIG. 1A is a perspective view of the image pickup apparatus 100 as viewed from a front side, and FIG. 1B is a perspective view of the image pickup apparatus 100 as viewed from a rear side. Each of FIGS. 1A and 1B illustrates a state in which a lens apparatus (interchangeable lens) that is attachable to the image pickup apparatus 100 is detached.

The image pickup apparatus 100 is, for example, a digital camera (camera) that captures an object and acquires an image. A shutter button 30, a main dial (rotatable operation member) 200, and a mode changeover dial 40 are disposed on an upper surface of the image pickup apparatus 100. The shutter button 30 is an operation unit via which an image pickup instruction is given, and the mode changeover dial 40 is an operation unit via which various image pickup modes and the like are changed. A power switch 50 is further disposed on the upper surface of the image pickup apparatus 100. The power switch 50 is used when power of the image pickup apparatus 100 is turned on or off.

The main dial 200 can be operated in a plane substantially parallel to a rotational axis (predetermined axis). The main dial 200 can be easily operated in the plane substantially parallel to the rotational axis because a part of the main dial 200 is exposed and the main dial 200 protrudes in a rotational radial direction from a body frame 10 around the main dial 200. The main dial 200 is a rotatable operation member that can be rotated clockwise and counterclockwise. By rotationally operating the main dial 200, various setting values such as shutter speed and an aperture can be changed as described later.

An image display unit 70 and a set button 60 are disposed on a rear surface of the image pickup apparatus 100. The image display unit 70 includes TFT liquid crystal or organic EL and displays various setting screens and images acquired by image capturing. The set button 60 is a push button and is mainly used when a selection item is to be determined.

FIG. 2 is a block diagram of the image pickup apparatus 100. In FIG. 2, the same reference numerals are assigned to the same components as those illustrated in FIGS. 1A and 1B. The image pickup apparatus 100 includes a ROM 101 that is a non-volatile memory, and the ROM 101 stores a program that operates on a CPU 130. In this embodiment, the ROM 101 is a Flash-ROM, but the ROM 101 is not limited to this and may be another non-volatile memory. A RAM 102 is a volatile memory and is used as an image buffer for temporarily recording an image acquired by image capturing. The RAM 102 is also used for temporarily storing image data acquired as a result of image processing. The RAM 102 is also used as a working memory of the CPU 130. If an access speed is sufficient, a memory other than RAM may be used.

A power supply unit 105 includes a primary battery or a secondary battery, an AC adapter, and the like, and supplies power to each part of the image pickup apparatus 100 directly or via a DC-DC converter (not illustrated) or the like. The power switch 50 has, for example, mechanical on and off positions. The power switch 50 may be, for example, a push switch or an electrical switch. In a state where the power switch 50 is off, the image pickup apparatus 100 does not function and is held in a state of low power consumption even in a state where various power supplies such as batteries are inserted in the power supply unit 105. When the power switch 50 is turned on in the state where various power supplies are inserted in the power supply unit 105, the image pickup apparatus 100 functions as a camera.

The CPU (controller) 130 controls the entire image pickup apparatus 100. The CPU 130 performs a predetermined process according to a rotation of a magnet 210 described below. For example, the CPU 130 changes various setting values such as a shutter speed and an aperture and further changes a display of the image display unit 70 according to an operation on the main dial 200 detected by a detector 140 described below. The CPU 130 includes a timer 131 and a counter 132. At least one of the timer 131 and the counter 132 may be externally attached to the CPU 130. The timer 131 starts and ends time measuring according to an instruction from the CPU 130. The timer 131 may be continuously operated so that interruptions are periodically generated in the CPU 130 at predetermined time intervals. The counter 132 counts the number of operations on the main dial 200. The counter 132 may count the number of operations on the other operation units in addition to counting the number of the operations on the main dial 200.

The detector 140 includes a first magnetic field detector 141 and a second magnetic field detector 142 and detects a change in a magnetic field (magnetic flux density) caused by the rotation of the magnet 210. The detector 140 includes, for example, a Hall IC sensor, an MR sensor, or the like. An upper threshold and a lower threshold are set for each of the first magnetic field detector 141 and the second magnetic field detector 142. If the magnetic flux density (magnetic field) exceeds the upper thresholds or falls below the lower thresholds, the first magnetic field detector 141 and the second magnetic field detector 142 outputs detection signals. The CPU 130 can read the detection signal detected by the first magnetic field detector 141 or the second magnetic field detector 142 at a predetermined timing.

The magnet 210 is a ring-shaped permanent magnet, and along a circumference (outer circumference) of the magnet 210, S poles and N poles are alternately magnetized in an axial direction of a central axis at predetermined pitches. The magnet 210 is attached so that the magnet 210 is rotatable integrally with the main dial 200, and rotates in conjunction with a rotation operation on the main dial 200. When the magnet 210 rotates, the detector 140 detects a change in the magnetic flux density (magnetic field) of the magnet 210, and the CPU 130 acquires a rotational direction and a rotational amount of the main dial 200 based on the detection result. The main dial 200, the magnet 210, and the detector 140 are included in a dial unit (rotatable operation apparatus) 20.

Figure 3A:
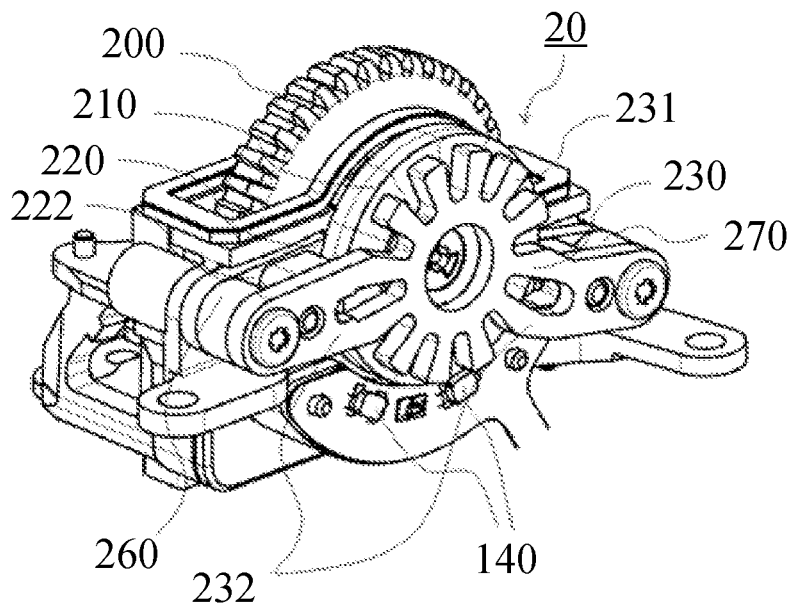
FIGS. 3A and 3B are a perspective view and a sectional view of a dial unit according to the first embodiment.
Figure 3B:
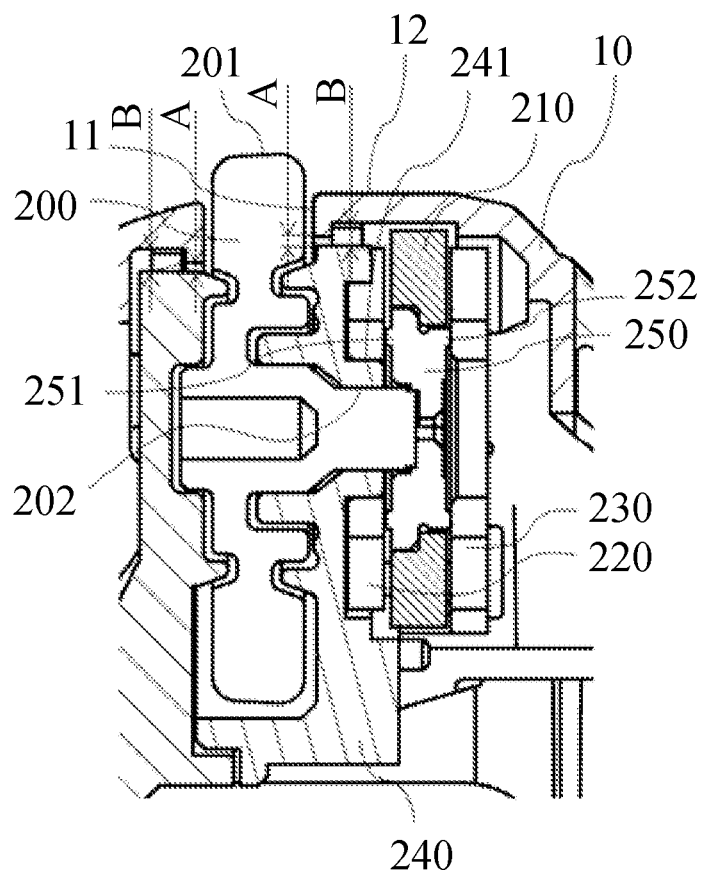
Figure 4:
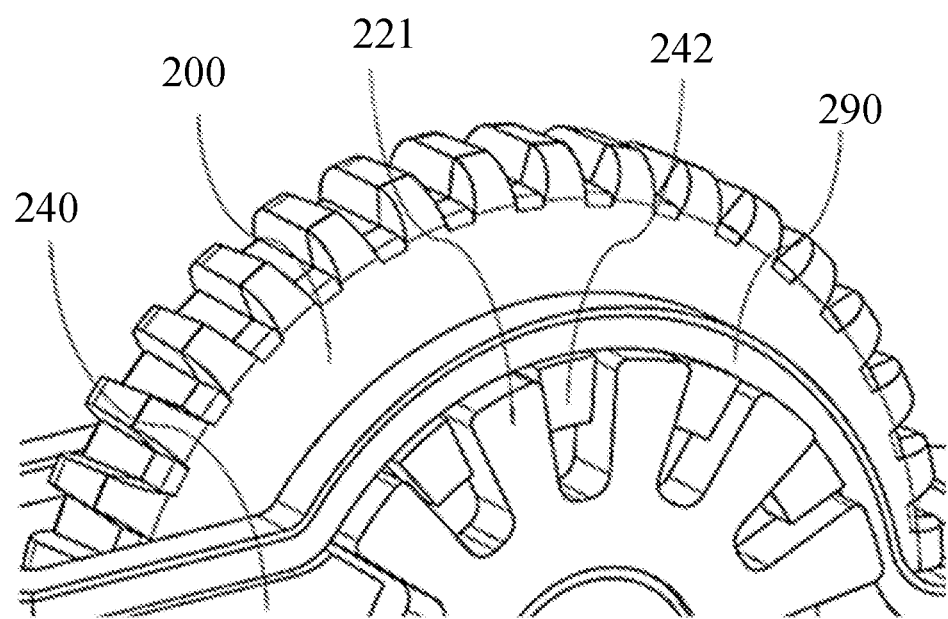
FIG. 4 is a perspective view of a main part of the dial unit according to the first embodiment.

Next, a description is given below of a configuration of the dial unit 20 according to this embodiment with reference to FIGS. 3A to 4. FIG. 3A is a perspective view of the dial unit 20 as viewed from a rear upper side, and FIG. 3B is a sectional view of the dial unit 20. FIG. 4 is a perspective view of a main part of the dial unit 20 and illustrates an enlarged perspective view of the dial unit 20 in a state where illustrations of the magnet 210, a magnet holding member 250, and a second magnetic member 230 are omitted.

As illustrated in FIGS. 3A and 3B, the dial unit 20 mainly includes the main dial 200, the magnet 210 that rotates integrally with the main dial 200, and a first magnetic member 220 and a second magnetic member 230 that are provided for generating a rotational operation force. The main dial 200 includes an operation portion 201 operated by the user and a rotational axis portion 202 that serves as a rotational axis when the main dial 200 rotates. The rotational axis portion 202 of the main dial 200 is rotatably supported by a bearing portion 241 of the base member 240.

The magnet 210 is attached to a position that faces the main dial 200 and is on an opposite side of the base member 240 from the main dial 200, and is attached via a magnet holding member 250 fixed to a tip of the rotational axis portion 202 with an adhesive or the like. In this embodiment, the rotational axis portion 202 is formed on a main dial 200 side, but the position is not limited to this, and the rotational axis portion 202 may be formed on a magnet holding member 250 side. As a method for fixing the magnet 210 to the magnet holding member 250, a method such as insert molding can be appropriately selected alternatively to the fixing with the adhesive.

The first magnetic member 220 and the second magnetic member 230, which are magnetic members, are arranged on the sides of the magnet 210 so that the magnet 210 is disposed between the first magnetic member 220 and the second magnetic member 230 in the rotational axis direction. That is, the first magnetic member 220 and the second magnetic member 230 are arranged so that each of them faces a magnetized surface of the magnet 210 and the magnet 210 is disposed between them. The magnet 210, the first magnetic member 220, and the second magnetic member 230 are likely to be worn if the magnet 210 comes into direct contact with the first magnetic member 220 and the second magnetic member 230 when the magnet 210 rotates, and thus the magnet 210 is prevented from positively contacting with first magnetic member 220 and the second magnetic member 230 by providing spaces made by spacer members between them (details of their configurations are described below). Although not illustrated in FIGS. 3A and 3B, a shape of the first magnetic member 220 is the same as a shape of the second magnetic member 230. In this embodiment, the magnet 210, the first magnetic member 220, and the second magnetic member 230 are housed inside the body frame 10. In this embodiment, the magnet 210, the first magnetic member 220, and the second magnetic member 230 are located on an opposite side of the base member 240 from the main dial 200.

As described above, the magnet 210 is a ring-shaped permanent magnet in which the S poles and the N poles are alternately magnetized along the circumference (outer circumference) at the predetermined pitches in the direction parallel to the axial direction of the rotational axis. On the first magnetic member 220 and the second magnetic member 230, first comb teeth (first tooth) 221 (not illustrated and having the same shape as the shape of 231) and second comb teeth (second tooth) 231 are respectively formed at the same pitches and of the same number as the pitches and the number of the poles of the magnet 210, the teeth extending in a radial direction (outer circumference direction) from the center. An operation force (magnetic operation force) is generated on the main dial 200 according to a change in positional relationships between the plurality of magnetic poles and the first and second comb teeth 221 and 231 facing the magnetic poles.

At outer peripheral tips of the first comb teeth 221 and the second comb teeth 231, pairs of arm portions 222 (232) (partially not illustrated) extending outward are formed at positions such that the pairs substantially face each other and the center of the axis is located between the arms. A tip of each arm portion of the pairs of arm portions 222 (232) has a screw fastening portion and is fixed to a cover member 280 together with the base member 240 by a screw in a state where spacer members 260 (270) are located between the magnetic members. In this embodiment, as described above, the first magnetic member 220 and the second magnetic member 230 are formed as common components, and in the case where they are common, it is possible to reduce deviations caused by component tolerances, to easily make the operation force stabilized, and to reduce a manufacturing cost. The shape, the fixing method, and the like of each magnetic member are not limited to the above-described configurations, and other methods may be used. A modification example is described later.

The detector 140 is mounted on a substrate and disposed at a desired position. As described above, the detector 140 detects a change in the magnetic flux density (magnetic field) of the magnet 210, and the CPU 130 acquires the rotational direction and the rotational amount of the main dial 200 based on the detection result.

As illustrated in FIG. 3B, the dial unit 20 is attached to the body frame 10 from an inner side so that a part of the main dial 200 is exposed to the outside from an opening portion 11 provided on the body frame 10. In the vicinity of the opening portion 11, the body frame 10 is close to the base member 240 and the cover member 280 with a square-shaped entire perimeter provided with a gap A between them. The gap A is set as narrow as possible so that water and dust are prevented from entering the main body of the image pickup apparatus 100 from this gap.

On an inner side of the gap A, a gap B is provided in a square shape on an entire perimeter so that a sealing member 290 is provided and water and dust entering through the gap A are prevented from entering. The sealing member 290 may be slightly thicker than the gap B and may be made of a material that does not easily allow water to pass through.

In this embodiment, the larger the diameters and the thicknesses of the magnet 210, the first magnetic member 220, and the second magnetic member 230, the higher the operation force of the main dial 200. Their sizes in the radial direction can be increased to some extent by providing a bulge portion 12 on the body frame 10, but an outer diameter of the bulge portion may be smaller than the outer diameter of the operation portion 201 so as not to impair the operability of the main dial 200, and therefore the sizes in the radial direction are limited. On the other hand, in a case where their sizes are to be increased in the thickness direction, an installation space for them is limited due to the recent miniaturization of the main body of the image pickup apparatus 100, and therefore the thicknesses are also limited.

In this embodiment, in order that the increase in the thickness of the dial unit 20 is suppressed, the magnet 210, the first magnetic member 220, and the second magnetic member 230 are arranged close to the main dial 200 side. The sealing member 290 may have a width of at least about 1.0 mm so as to provide sufficient dust-proof and drip-proof performance. However, in a case where a sticking surface for the sealing member 290 is to be formed only on the base member 240, the first magnetic member 220 is required to be located slightly away from the main dial 200.

In this embodiment, as illustrated in FIG. 4, a part of the sticking surface for the sealing member 290 is formed on the base member 240, and the other part of the sticking surface is formed on an outer circumferential surface of the first comb teeth 221 and on a plurality of extending portions 242 that extend from the base member 240 to a first magnetic member 220 side and pass through between the first comb teeth 221. According to this configuration, the first magnetic member 220 can be disposed close to the main dial 200 side, and it is possible to provide dustproof and drip-proof performance while an increase in size is suppressed.

In this embodiment, since the first magnetic member 220 and the second magnetic member 230 are arranged so that the magnet 210 is disposed between them as described above, most of the magnetic flux generated from the magnet 210 flows to each magnetic member, and there is almost no leakage of the magnetic flux to an outer side of an outer diameter of the magnet 210. As a result, although the magnet 210 is located near an exterior portion of the body frame 10, the magnetic field has almost no effect on the exterior of the main body of the image pickup apparatus 100 and does not attract iron sand and the like.

According to this embodiment, it is possible to provide a magnetic rotatable operation apparatus and an electronic apparatus each of which has good dustproof and drip-proof performance while suppressing the thickness of the dial unit 20.

Next, a configuration of rotation detection in this embodiment is described with reference to FIGS. 5A to 5D. The image pickup apparatus 100 can detect the rotational direction and the rotational amount by detecting a plurality of magnetic fields whose magnetic flux densities change with the rotation of the operation member. FIGS. 5A to 5D are diagrams illustrating a positional relationship between the magnet 210 and the detector 140. Here, only the magnet 210 and the detector 140 are illustrated.

Figure 5B:
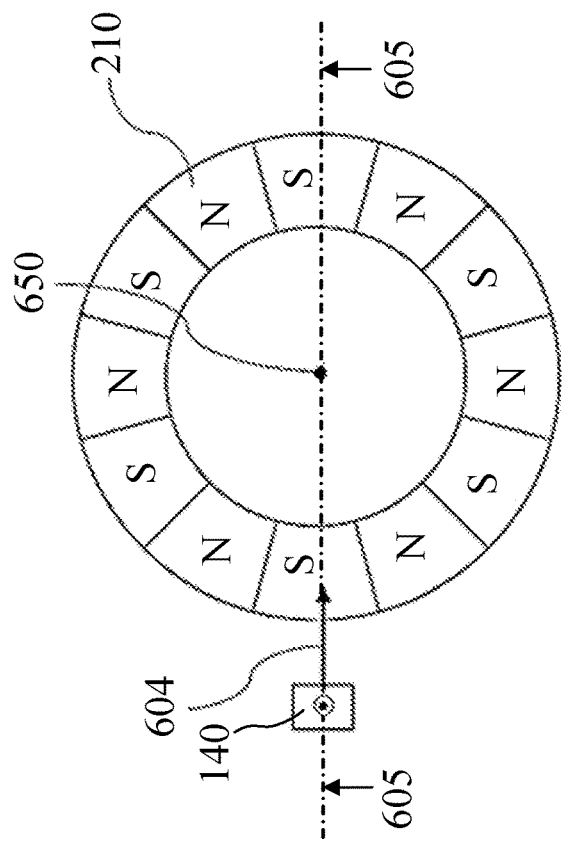
FIGS. 5A to 5D are diagrams each illustrating a positional relationship between a magnet and a detector according to the first embodiment.
Figure 5D:
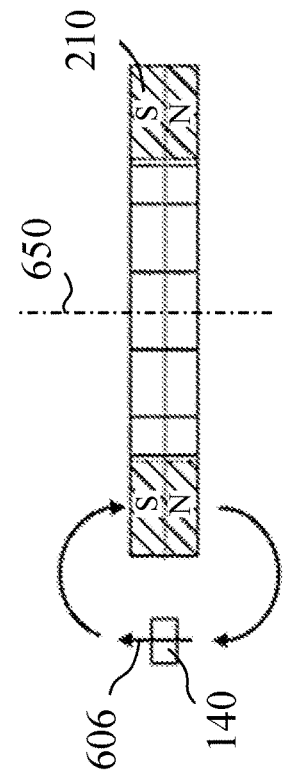
Figure 5A:
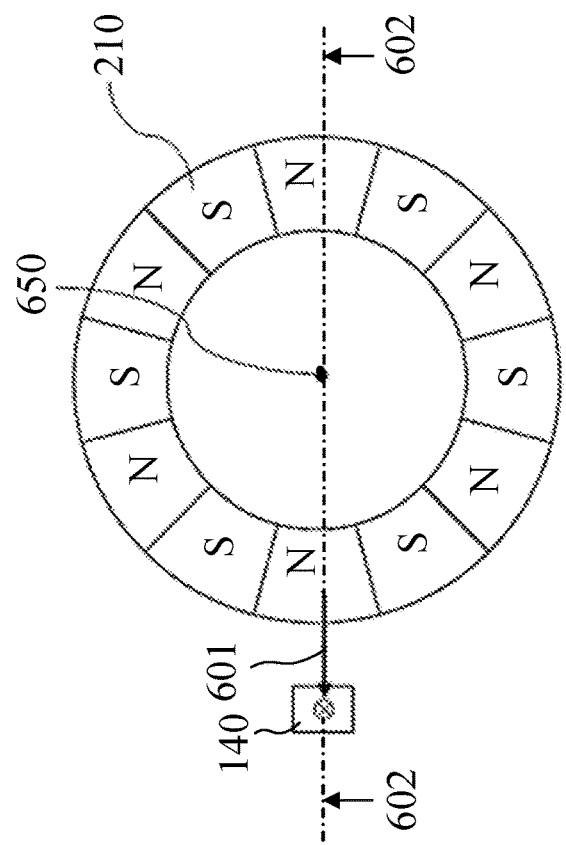

FIG. 5A illustrates the positional relationship between the magnet 210 and the detector 140. The magnet 210 rotates about a rotational axis 650. Hereinafter, an axial direction of the rotational axis 650 is referred to as a thrust direction, a direction extending radially around the rotational axis 650 is referred to as a radial direction, and a direction of clockwise or counterclockwise rotation about the rotational axis 650 is referred to as a circumferential direction. In FIG. 5A, a rotational phase is such that the detector 140 faces an N pole of the magnet 210 on a thrust direction projection plane. An arrow 601 represents a magnetic field heading from the magnet 210 toward the detector 140. Here, only the magnetic field related to the detector 140 is illustrated for simplification.

Figure 5C:
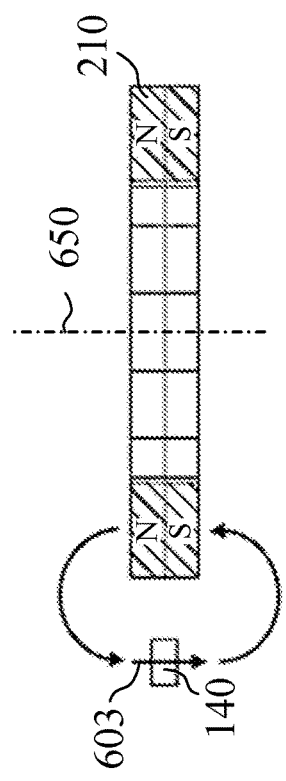

FIG. 5C is a sectional view along a line 602-602 illustrated in FIG. 5A. Since the magnet 210 is magnetized in the thrust direction, a magnetic field having exited the N pole passes through the detector 140 as indicated by an arrow 603 and heads toward an S pole. The detector 140 detects a magnetic flux density of the arrow 603.

FIG. 5B illustrates a state in which the magnet 210 is rotated by 30 degrees for one pole about the rotational axis 650 from the state illustrated in FIG. 5A. The rotational phase is such that the detector 140 faces an S pole of the magnet 210 on the thrust direction projection plane. An arrow 604 represents a magnetic field heading from the detector 140 toward the magnet 210. Here, only the magnetic field related to the detector 140 is illustrated for simplification.

FIG. 5D is a sectional view along a line 605-605 illustrated in FIG. 5B. Since the magnet 210 is magnetized in the thrust direction, a magnetic field having exited an N pole passes through the detector 140 as indicated by an arrow 606 and heads toward the S pole. The detector 140 detects a magnetic flux density of the arrow 606.

As illustrated in FIGS. 5A and 5B, the detector 140 is disposed at a position that does not overlap with the magnet 210 on the thrust direction projection plane (in a view from the thrust direction of the magnet 210). The detector 140 detects the magnetic flux density that changes with the rotation of the magnet 210 and detects the rotational direction and the rotational amount of the magnet 210. The details of the detecting method are described below with reference to FIG. 7.

Figure 6A:
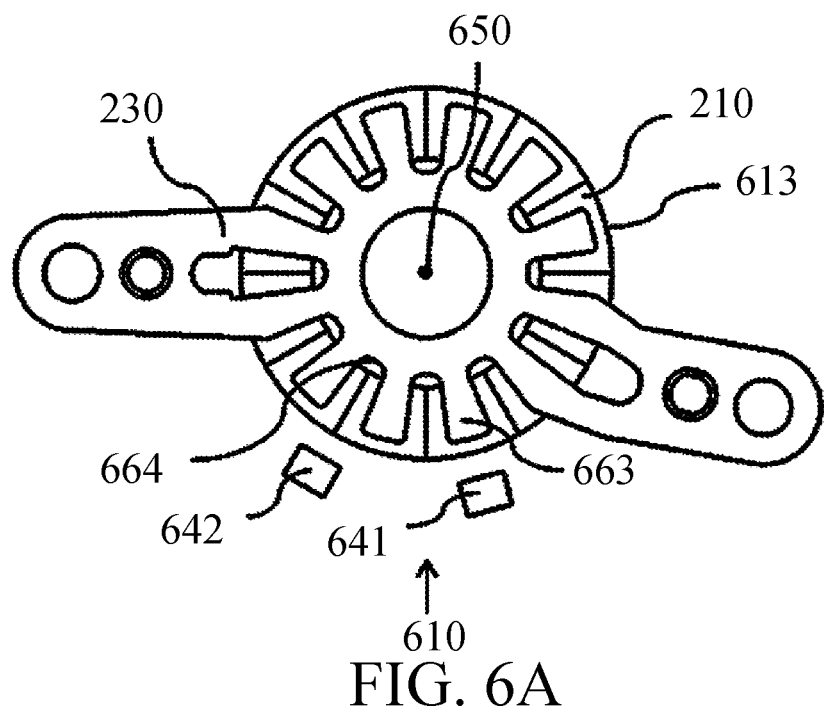
FIGS. 6A and 6B are diagrams each illustrating a positional relationship between a magnetic member, the magnet, and the detector according to the first embodiment.
Figure 6B:
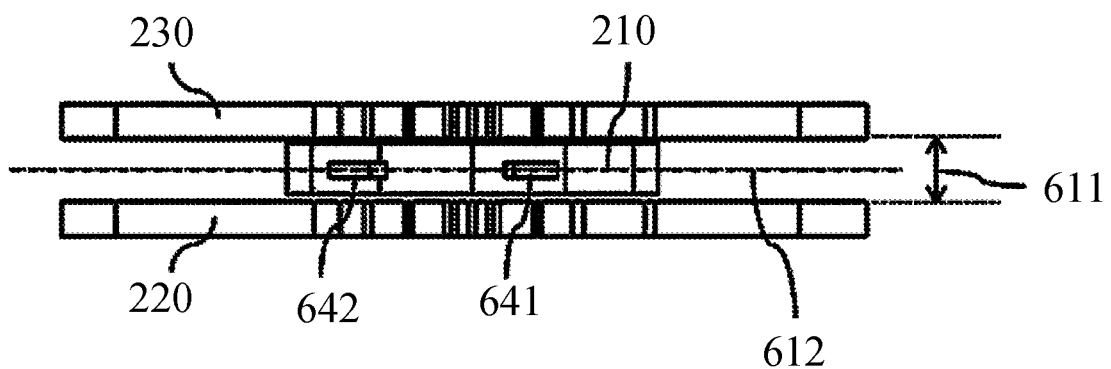

Next, a positional relationship between the magnetic member, the magnet, and the detector is described with reference to FIGS. 6A and 6B. Each of FIGS. 6A and 6B is a diagram illustrating the positional relationship between the magnetic member, the magnet, and the detector. Here, only the magnetic member, the magnet, and the detector are illustrated. In FIGS. 6A and 6B, the first magnetic field detector 141 described with reference to FIG. 2 corresponds to a first magnetic field detector 641, and the second magnetic field detector 142 described with reference to FIG. 2 corresponds to a second magnetic field detector 642.

FIG. 6A is a diagram illustrating a relationship between the magnetic member, the magnet, and the detector as viewed from the thrust direction. FIG. 6B is a diagram illustrating the state of FIG. 6A as viewed from a direction of an arrow 610. Each of the first magnetic member 220 and the second magnetic member 230 has the comb teeth of the same number as the number of polarizations. The first comb teeth 221 of the first magnetic member 220 and the second comb teeth 231 of the second magnetic member 230 are collectively referred to as magnetic comb teeth 663. Valleys between the magnetic comb teeth 663 are referred to as magnetic member valleys (valley portion) 664. If no force is applied to the main dial 200 (not illustrated) and the magnet 210 is stationary, each of the magnetic comb teeth 663 faces a pole of the magnet 210 in the thrust direction, as illustrated in FIG. 6A. This is caused by a balance of magnetic forces between the magnet 210 and each of the first magnetic member 220 and the second magnetic member 230. The main dial 200 is operated by the user, and the magnet 210 rotates about the rotational axis 650. At this time, as described above, the operation force is caused by the change in the position of the magnet 210 relative to the positions of the first magnetic member 220 and second magnetic member 230, and the user feels an operational feeling.

The detector 140 includes the first magnetic field detector 641 and the second magnetic field detector 642. The first magnetic field detector 641 is disposed on an extension in the radial direction of the magnetic comb teeth 663 when viewed from the thrust direction, i.e., on the thrust direction projection plane. The second magnetic field detector 642 is disposed on an extension in the radial direction of the magnetic member valleys 664 when viewed from the thrust direction, i.e., on the thrust direction projection plane. Therefore, the first magnetic field detector 641 and the second magnetic field detector 642 can detect changes in the magnetic flux density in different phases. By detecting the changes in magnetic flux density caused by the rotation of the magnet 210 in the different phases, the rotational direction and the rotational amount can be detected. The details of the detecting method are described below with reference to FIG. 7.

As illustrated in FIG. 6B, the first magnetic field detector 641 and the second magnetic field detector 642 are disposed in a space 611 between the magnetic members, which are the second magnetic member 230 and the first magnetic member 220. Since the magnetic field is drawn into the first magnetic member 220 and the second magnetic member 230, if the first magnetic field detector 641 and the second magnetic field detector 642 are disposed outside the space 611 between the magnetic members in the thrust direction, the first magnetic field detector 641 and the second magnetic field detector 642 cannot detect the changes in the magnetic flux density required for the rotation detection. Since the first magnetic field detector 641 and the second magnetic field detector 642 are disposed in the space 611 between the magnetic members, it is possible to detect the changes in the magnetic flux density required for the rotation detection. The magnetic flux density in the thrust direction becomes the highest in the center between the magnetic members, and therefore the first magnetic field detector 641 and the second magnetic field detector 642 may be disposed on a center line 612 between magnetic members.

When viewed from the thrust direction, each of the magnetic comb teeth 663 facing the first magnetic field detector 641 has a length equal to or shorter than an outer diameter 613 of the magnet 210. That is, when viewed from the thrust direction, the tips of the first comb tooth and the second comb tooth are located at positions closer to the rotational axis 650 than the outer diameter (outer circumference) 613 of the magnet 210 (or at the same distance from the rotational axis 650 as the outer diameter 613). If the magnetic comb teeth 663 facing the first magnetic field detector 641 protrudes from the outer diameter 613 of the magnet 210, the magnetic field exiting the magnet 210 is drawn into the first magnetic member 220 and the second magnetic member 230. As a result, the first magnetic field detector 641 cannot detect the change in the magnetic flux density required for the rotation detection. In a case where each of the magnetic comb teeth 663 is set to have a length equal to or shorter than the outer diameter 613 of the magnet 210, the magnetic flux density required for the rotation detection can be detected.

In this embodiment, each of the first magnetic field detector 641 and the second magnetic field detector 642 includes a Hall element. However, this embodiment is not limited to the Hall elements, and other detection elements such as MR elements may be used. Alternatively, different types of detection elements may be used in the first magnetic field detector 641 and the second magnetic field detector 642.

Figure 7:
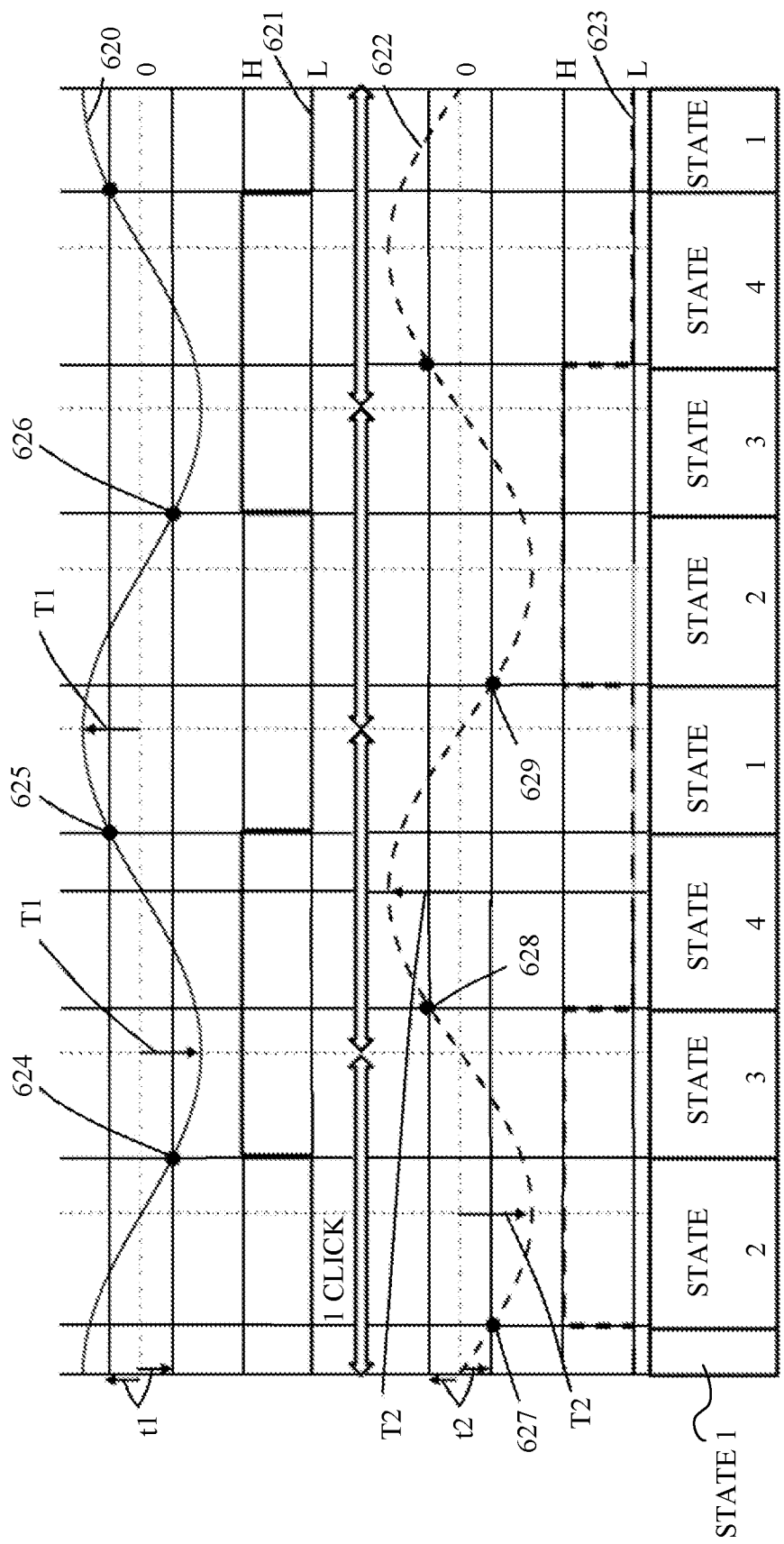
FIG. 7 is an explanatory diagram of clockwise rotation detection according to the first embodiment.
Figure 8:
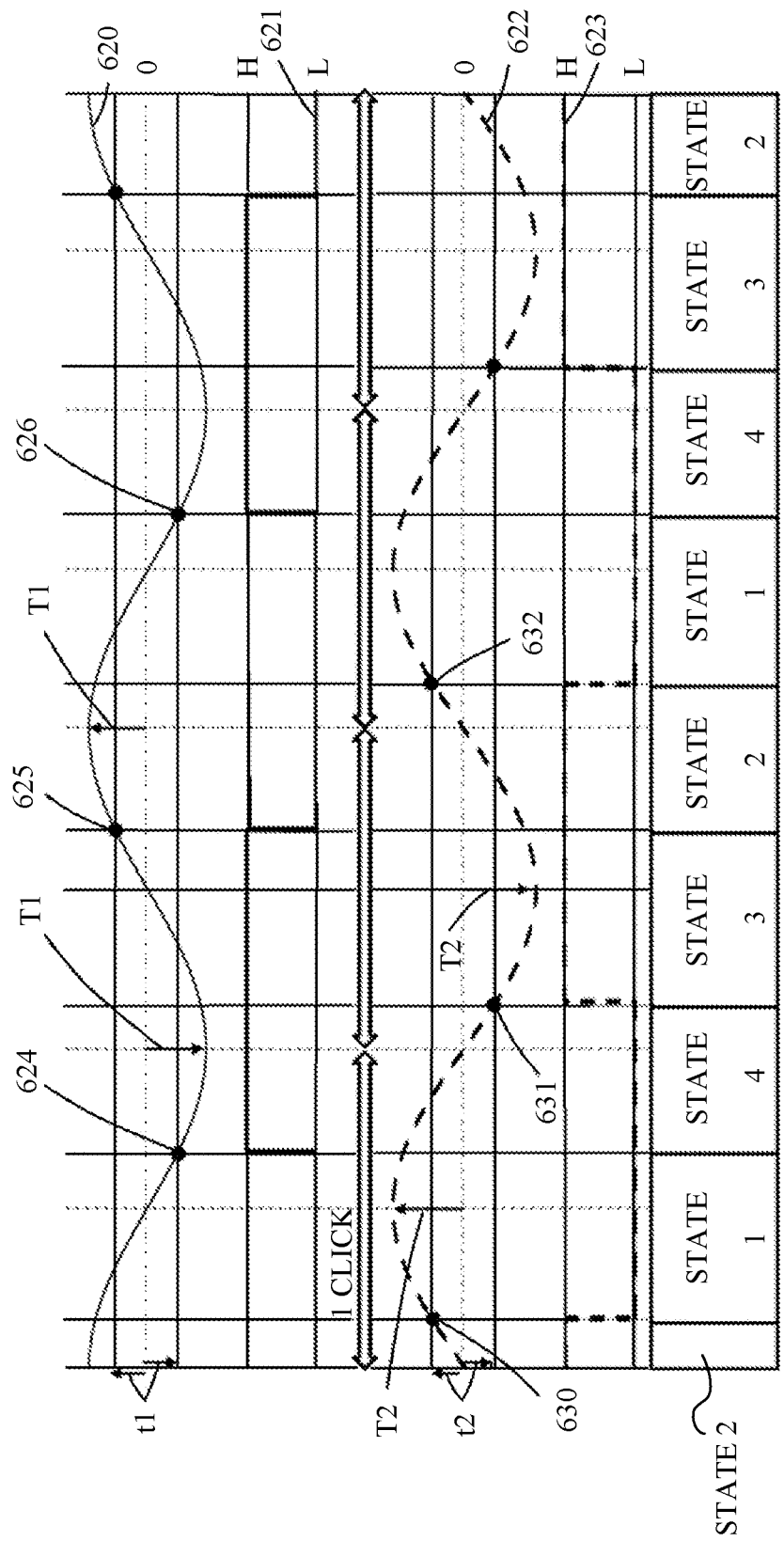
FIG. 8 is an explanatory diagram of counterclockwise rotation detection according to the first embodiment.

Next, with reference to FIGS. 7 and 8, a detailed description is given of changes in the magnetic field and the output signals from the first magnetic field detector 641 and the second magnetic field detector 642 while the dial is rotated. FIG. 7 is an explanatory diagram of clockwise rotation detection and illustrates a graph representing a relationship between the magnetic flux density and output from the first magnetic field detector 641 and the second magnetic field detector 642 that have detected the magnetic flux density. In FIG. 7, a horizontal axis represents a rotational angle of the main dial 200. From the top, a vertical axis represents a magnetic flux density 620 in the thrust direction at the position of the first magnetic field detector 641, a first detection signal 621 from the first magnetic field detector 641, a magnetic flux density 622 in the thrust direction at the position of the second magnetic field detector 642, and a second detection signal 623 from the second magnetic field detector 642.

T1 indicates an absolute value of maximum and minimum values of the magnetic flux density 620, and t1 indicates an absolute value of detection thresholds of the first magnetic field detector 641. T2 indicates an absolute value of maximum and minimum values of the magnetic flux density 622, and t2 indicates an absolute value of detection thresholds of the second magnetic field detector 642. Here, the magnetic flux density 620 represents the magnetic flux density in the thrust direction of the magnetic field detected by the first magnetic field detector 641. The magnetic flux density 622 represents the magnetic flux density in the thrust direction of the magnetic field detected by the second magnetic field detector 642.

As described above, the main dial 200 in this embodiment generates the operational feeling by the magnetic attraction force between the magnet 210 and each of the first magnetic member 220 and second magnetic member 230, and a basic unit of the rotational operation on the main dial 200 is one click. In this embodiment, the rotatable operation member has twelve clicks and the number of the polarizations of the magnet is twelve, and FIG. 7 illustrates changes in the magnetic flux densities of 120 degrees (four clicks).

In this graph, it is assumed that the main dial 200 is rotated clockwise at a constant speed from a left end to a right end of the graph, and as is clear from FIG. 7, each magnetic flux density changes periodically between the maximum and minimum values with zero as its center. In the state at the left end of the graph, the magnetic flux density 620 takes the maximum value of "T1". In the same state, the magnetic flux density 622 is zero.

When the main dial 200 is rotated from this state and becomes a state of rotated to ½ click, the magnetic flux density 620 becomes zero and the magnetic flux density 622 takes the minimum value of "−T2". When the main dial 200 is rotated and becomes a state of rotated by one click, the magnetic flux density 620 takes the minimum value of "−T1" and the magnetic flux density 622 becomes zero.

As described above, when the main dial 200 moves by one click, the magnet 210 rotates by one magnetic pole, and each of the magnetic flux density 620 in the thrust direction and the magnetic flux density 622 in the thrust direction changes by ½ cycle. The magnetic flux density 620 in the thrust direction and the magnetic flux density 622 in the thrust direction are signals shifted by ¼ cycle. The detector 140 detects the order and number of times when the two signals exceed the threshold values, which makes it possible to acquire the rotational amount and the rotational direction of the main dial 200.

The detector 140 generally uses a method called an alternate detection type and changes the output value from high (hereinafter referred to as H) to low (hereinafter referred to as L) when the magnetic flux density exceeds the upper threshold. Further, once the magnetic flux density exceeds the upper threshold, the output value is maintained until the magnetic flux density falls below the lower threshold. Once the magnetic flux density falls below the lower threshold, the output value is maintained until the magnetic flux density exceeds the upper threshold.

In the graph of FIG. 7, it is assumed that the main dial 200 is rotated clockwise at a constant speed from the left end to the right end of the graph, and the output value at the left end indicates a state of clockwise rotation before the rotation illustrated in the graph. Specifically, at the left end, the first magnetic field detector 641 detects a state in which the magnetic flux density has exceeded the upper threshold of "t1", and therefore the first detection signal 621 becomes L. Then, in the first magnetic field detector 641, the first detection signal 621 becomes L from the left end of the graph to when the magnetic flux density falls below the lower threshold of "−t1" (at a point 624).

Next, in the first magnetic field detector 641, the first detection signal 621 becomes H from when the magnetic flux density falls below the lower threshold of "−t1" (at the point 624) to when the magnetic flux density exceeds the upper threshold of "t1" (at a point 625). The first detection signal 621 becomes L from when the magnetic flux density exceeds the upper threshold "t1" (at the point 625) to when the magnetic flux density falls below the lower threshold of "−t1" again (at a point 626).

On the other hand, at the left end, the second magnetic field detector 642 detects a state in which the magnetic flux density has exceeded the upper threshold of "t2", and therefore the second detection signal 623 becomes L. Then, in the second magnetic field detector 642, the second detection signal 623 becomes L from the left end of the graph to when the magnetic flux density falls below the lower threshold of "−t2" (at a point 627).

Next, in the second magnetic field detector 642, the second detection signal 623 becomes H from when the magnetic flux density falls below the lower threshold "−t2" (at the point 627) to when the magnetic flux density exceeds the upper threshold of "t2" (at a point 628). Further, the second detection signal 623 becomes L from when the magnetic flux density exceeds the upper threshold of "t2" (at the point 628) to when the magnetic flux density falls below the lower threshold of "−t2" again (at a point 629).

As indicated in the table of FIG. 7, combinations of the first detection signal 621 and the second detection signal 623 define a state 1, a state 2, a state 3, and a state 4. The state 1 is a state where the first detection signal 621 is L and the second detection signal 623 is L. The state 2 is a state where the first detection signal 621 is L and the second detection signal 623 is H. The state 3 is a state where the first detection signal 621 is H and the second detection signal 623 is H. The state 4 is a state where the first detection signal 621 is H and the second detection signal 623 is L.

When the main dial 200 rotates clockwise, the detection state transitions in an order of the state 1, the state 2, the state 3, and the state 4 from the left end of the graph. Further, when the main dial 200 rotates clockwise, the rotational amount for one click is detected at a transition from the state 2 to the state 3 and a transition from the state 4 to the state 1. If there is a transition from the state 2 to the state 3 or from the state 4 to the state 1 within one click, a clockwise rotational direction is detected.

FIG. 8 is an explanatory diagram of counterclockwise rotation detection. In the graph of FIG. 8, it is assumed that the main dial 200 is rotated counterclockwise at a constant speed from a left end to a right end of the graph, and the output value at the left end indicates a state of counterclockwise rotation before the rotation illustrated in the graph. Specifically, at the left end, the first magnetic field detector 641 detects a state in which the magnetic flux density has exceeded the upper threshold of "t1", and therefore the first detection signal 621 becomes L. Then, in the first magnetic field detector 641, the first detection signal 621 becomes L from the left end of the graph to when the magnetic flux density falls below the lower threshold of "−t1" (at the point 624).

Next, in the first magnetic field detector 641, the first detection signal 621 becomes H from when the magnetic flux density falls below the lower threshold of "−t1" (at the point 624) to when the magnetic flux density exceeds the upper threshold of "t1" (at the point 625). Further, the first detection signal 621 becomes L from when the magnetic flux density exceeds the upper threshold of "t1" (at the point 625) to when the magnetic flux density falls below the lower threshold of "−t1" again (at the point 626). On the other hand, at the left end, the second magnetic field detector 642 detects a state in which the magnetic flux density has fallen below the lower threshold of "42", and therefore the second detection signal 623 becomes H. Then, in the second magnetic field detector 642, the second detection signal 623 becomes H from the left end of the graph to when the magnetic flux density exceeds the upper threshold of "t2" (at a point 630).

Next, in the second magnetic field detector 642, the second detection signal 623 becomes L from when the magnetic flux density exceeds the upper threshold of "t2" (at the point 630) to when the magnetic flux density falls below the lower threshold of "−t2" (at a point 631). Further, the second detection signal 623 becomes H from when the magnetic flux density falls below the lower threshold of "−t2" (at the point 631) to when the magnetic flux density exceeds the upper threshold of "t2" again (at a point 632).

As described with reference to FIG. 7, the combinations of the first detection signal and the second detection signal define the state 1, the state 2, the state 3, and the state 4. Therefore, when the main dial 200 rotates counterclockwise, the detection state transitions in the order of the state 2, the state 1, the state 4, and the state 3 from the left end. Further, when the main dial 200 rotates counterclockwise, the rotational amount for one click is detected at the transition from the state 1 to the state 4 and the transition from the state 3 to the state 2. If there is a transition from the state 1 to the state 4 or from the state 3 to the state 2 within one click, a counterclockwise rotational direction is detected.

As described above, the state 1, the state 2, the state 3, and the state 4 can be defined by the combinations of the first detection signal 621 and the second detection signal 623. The transitions between these states are used for detecting the rotational amount and the rotational direction.

Figure 9A:
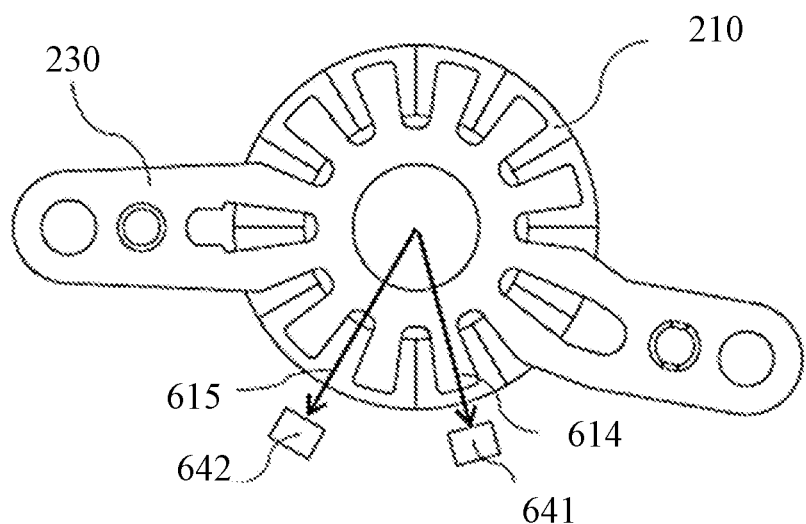
FIGS. 9A and 9B are diagrams each illustrating a position of the detector according to the first embodiment.
Figure 9B:
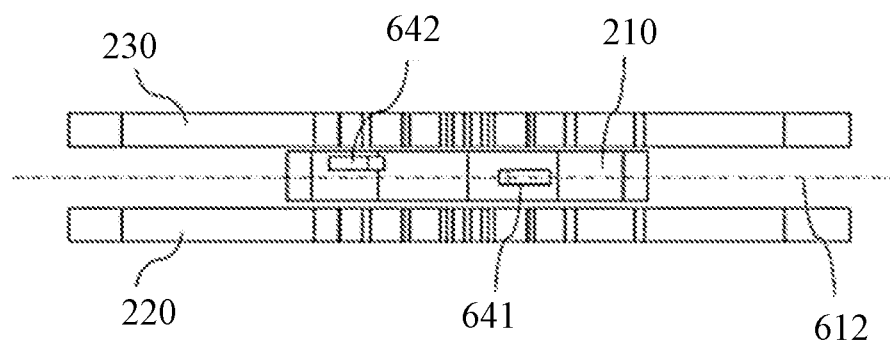

Next, with reference to FIGS. 9A and 9B, a description is given of a disposition of the detector for optimizing the detection timing of the magnetic field. FIGS. 9A and 9B are diagrams illustrating the disposition of the detector.

The changes in the magnetic flux density (magnetic field) detected by the first magnetic field detector 641 and the second magnetic field detector 642 are as illustrated in FIG. 7. The first magnetic field detector 641 is disposed on an extension in the radial direction of the magnetic comb teeth 663 on the thrust direction projection plane, and the second magnetic field detector 642 is disposed on an extension in the radial direction of the magnetic member valleys 664 on the thrust direction projection plane. Around magnetic comb teeth 663, the magnetic field leaks out less than around the magnetic member valleys 664 because the magnetic field is drawn into the first magnetic member 220 and the second magnetic member 230. Therefore, in a case where a position in the thrust direction and a distance in the radial direction are the same between the first magnetic field detector 641 and the second magnetic field detector 642, the magnetic flux density detected by the first magnetic field detector 641 is smaller than the magnetic flux density detected by the second magnetic field detector 642. That is, in each of FIGS. 7 and 8, the relationship is T1>T2. As T1 becomes larger beyond the threshold value of t1, the time at which the threshold value of t1 is exceeded becomes earlier. Therefore, in a case where T1 is too large as compared to the threshold value of t1, if an external factor such as a temperature environment is applied, the threshold value of t1 may be exceeded within a range of allowance of rotation of the rotatable operation member. Further, as T1 becomes closer to the threshold value of t1, the time when the threshold value of t1 is exceeded becomes later. Therefore, in a case where T1 becomes too close to the threshold value of t1, if an external factor such as a temperature environment is applied, T1 may not exceed the threshold value of t1. Therefore, the relationship between the threshold value of t1 and T1 may be appropriately (optimally) set. Similarly, a relationship between the threshold value of t2 and T2 may be appropriately (optimally) set.

It is assumed that the threshold value of t1 of the first magnetic field detector 641 and the threshold value of t2 of the second magnetic field detector 642 are equal and T1>T2. In this case, if the relationship between the threshold of t1 of the first magnetic field detector 641 and the magnetic field detected by the first magnetic field detector 641 is optimal, the relationship between the threshold of t2 of the second magnetic field detector 642 and the magnetic field detected by the second magnetic field detector 642 is not optimal.

Next, it is assumed that the threshold value of t1 and the threshold value of t2 are equal and T1>T2. In this case, as illustrated in FIG. 9A, if a distance 615 in a second radial direction is larger than a distance 614 in a first radial direction, it is possible to make close intensities of the magnetic field respectively detected by the first magnetic field detector and the second magnetic field detector. Further, if the threshold value of t1 and the threshold value of t2 are equal and T1>T2, the relationship between the threshold value of t1 or t2 and the detected magnetic field can be optimized by a method illustrated in FIG. 9B.

FIG. 9B illustrates the positional relationship between the magnetic members and the detector when viewed on the radial direction projection plane, as in FIG. 6B. As illustrated in FIG. 9B, the positions in the thrust direction of the first magnetic field detector 641 and the second magnetic field detector 642 are different. If the position in the thrust direction of the second magnetic field detector 642 is farther from the center line 612 between magnetic members than the position in the thrust direction of the first magnetic field detector 641, it is possible to make close the intensities of the magnetic field respectively detected by the first magnetic field detector 641 and the second magnetic field detector 642.

On the other hand, in a case of T1>T2, by making different the threshold t1 of the first magnetic field detector 641 and the threshold t2 of the second magnetic field detector 642, the relationship between the threshold of t1 or t2 and the magnetic field detected by the magnetic field detector can be also optimized.

According to this embodiment, by disposing the detector at a position that does not overlap the magnet in the thrust direction, the changes in magnetic flux density caused by the rotation of the magnet can be detected, making it possible to detect the rotation.

Second Embodiment

Next, a description is given of an image pickup apparatus according to the second embodiment of the present disclosure. In the image pickup apparatus 100 according to the first embodiment, the detector occupies a large area in the radial direction and may not be able to be disposed in an apparatus, or the size of the apparatus may have to be increased. In this embodiment, a description is given of a configuration of rotation detection that makes it possible to reduce an area occupied by a detector in consideration of a case where the detector is to be mounted on an apparatus with such a restriction on positions.

Figure 10A:
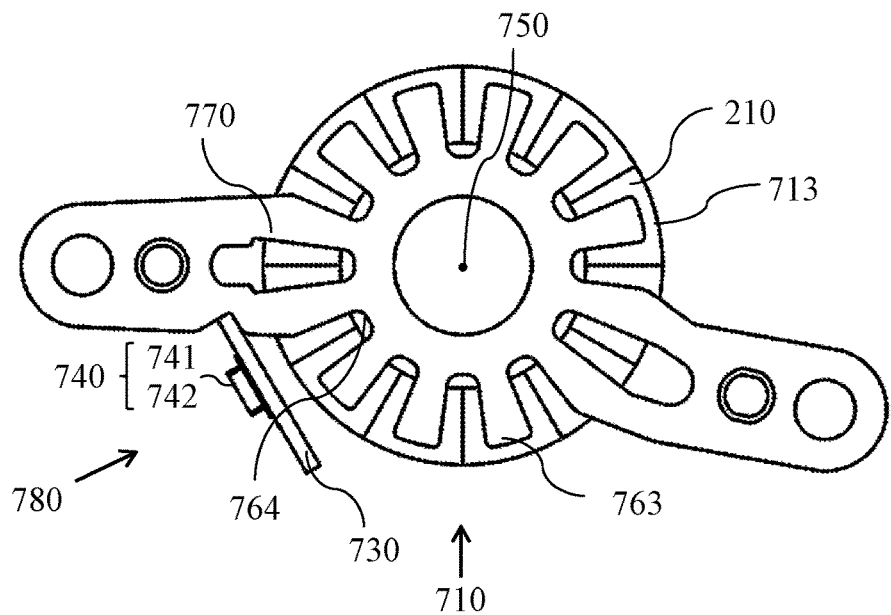
FIGS. 10A to 10C are diagrams each illustrating a positional relationship between a magnetic member, a magnet, and a detector according to a second embodiment.
Figure 10B:
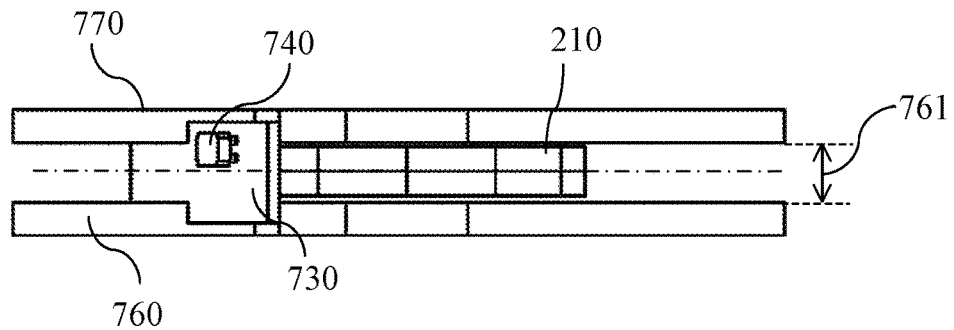
Figure 10C:
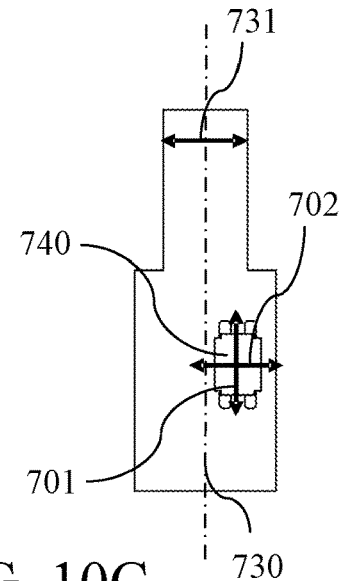

A description is given of a positional relationship between a magnetic member, a magnet, and a detector according to this embodiment with reference to FIGS. 10A to 10C. FIGS. 10A to 10C are diagrams illustrating the positional relationship between the magnetic member, the magnet, and the detector. Here, only the magnetic member, the magnet, and the detector are illustrated. FIG. 10A is a view of the magnetic member, the magnet, and the detector as viewed from the thrust direction. FIG. 10B is a view of a state illustrated in FIG. 10A as viewed from a direction of an arrow 710. FIG. 10C is a view of the detector (magnetic field detecting component 740) and a substrate 730 on which the detector is mounted, as viewed from a component mounting surface (a direction of an arrow 780).

In FIGS. 10A to 10C, each of a first magnetic member 760 and a second magnetic member 770 has comb teeth of the same number as the number of polarizations. The comb teeth (first tooth) of the first magnetic member 760 and the comb teeth (second tooth) of the second magnetic member 770 are collectively referred to as magnetic comb teeth 763. Valley portions between the magnetic comb teeth 763 are referred to as magnetic member valleys 764.

In a state where no force is applied to the main dial 200 and the magnet 210 is stationary, each of the magnetic comb teeth 763 faces a pole of the magnet 210 in the thrust direction, as illustrated in FIG. 10A. This is caused by a balance of magnetic forces between the magnet 210 and each of the first magnetic member 760 and the second magnetic member 770. The main dial 200 is operated by the user, and the magnet 210 rotates about a rotational axis 750. At this time, an operation force is caused by a change in the position of the magnet 210 relative to the positions of the first magnetic member 760 and second magnetic member 770, and the user feels an operational feeling. Here, from a viewpoint of detecting a magnetic field, each of the magnetic comb teeth 763 may have a length equal to or shorter than an outer diameter 713 of the magnet.

In this embodiment, the first magnetic field detector 141 described with reference to FIG. 2 corresponds to a first magnetic field detector 741, and the second magnetic field detector 142 described with reference to FIG. 2 corresponds to a second magnetic field detector 742. The detector includes the first magnetic field detector 741 and the second magnetic field detector 742, and, in this embodiment, is configured as a magnetic field detecting component 740 capable of detecting magnetic fields in two directions that vertically intersect with each other and as one package and is mounted on the substrate 730. The magnetic field detecting component 740 includes, for example, two magneto resistive (MR) elements.

As illustrated in FIG. 10A, the magnetic field detecting component 740 is disposed on an extension in the radial direction of the magnetic member valleys 764 on the thrust direction projection plane. As illustrated in FIGS. 10A and 10B, the magnetic field detecting component 740 is mounted on the substrate 730 that is disposed substantially parallelly to the circumferential direction of the magnet 210, and the substrate 730 is fixed to the first magnetic member 760 and the second magnetic member 770. The substrate 730 is a flexible printed circuit board to which a hard substrate (rigid substrate) or a reinforcing plate is attached, and the substrate 730 is extended from a fixed portion while its flatness is maintained so that the magnetic field detecting component 740, which is a mounting component, is disposed at a desired position.

The substrate 730 is disposed between the first magnetic member 760 and the second magnetic member 770 and its position is determined by, for example, bonding the substrate 730 in a state where the substrate 730 is abutted against precision surfaces that are parts of the first magnetic member 760 and the second magnetic member 770. In this way, a part of the substrate 730 overlaps with each of the first magnetic member 760 and the second magnetic member 770 in the thrust direction. Further, as illustrated in FIG. 10C, a width (width portion) 731 of a part of the substrate 730 substantially the same as a clearance (space) 761 between the first magnetic member 760 and the second magnetic member 770, and the substrate 730 functions as a spacer between the first magnetic member 760 and the second magnetic member 770.

The magnetic field detecting component 740 may be disposed in the vicinity of the magnet 210 from the viewpoint of magnetic field detection. In this embodiment, the magnetic field detecting component 740 is mounted on a surface on an outer side in the radial direction on the thrust direction projection plane (a surface of the substrate 730 opposite to a surface facing the magnet 210). With such a configuration, contact between the magnet 210, which is a rotating body, and the magnetic field detecting component 740 is unlikely to occur at the time when shock of falling, etc. occurs, while the magnetic field detecting component 740 is disposed in the vicinity of the magnet 210.

As described above, the magnetic field detecting component 740 can detect the magnetic fields in two vertically intersecting directions. Specifically, as illustrated in FIG. 10C, the magnetic field detecting component 740 can detect a magnetic field 701 in the circumferential direction of the magnet 210 and a magnetic field 702 in the thrust direction.

At this time, the relationship between the magnet and the detector when the magnetic field 702 in the thrust direction is detected is the same as the relationship of the first embodiment, and if the magnetic field 702 in the thrust direction is considered to be the magnetic field in the directions of the arrows 603 and 606, the relationship is as described with reference to FIG. 5A to 5D.

Figure 11A:
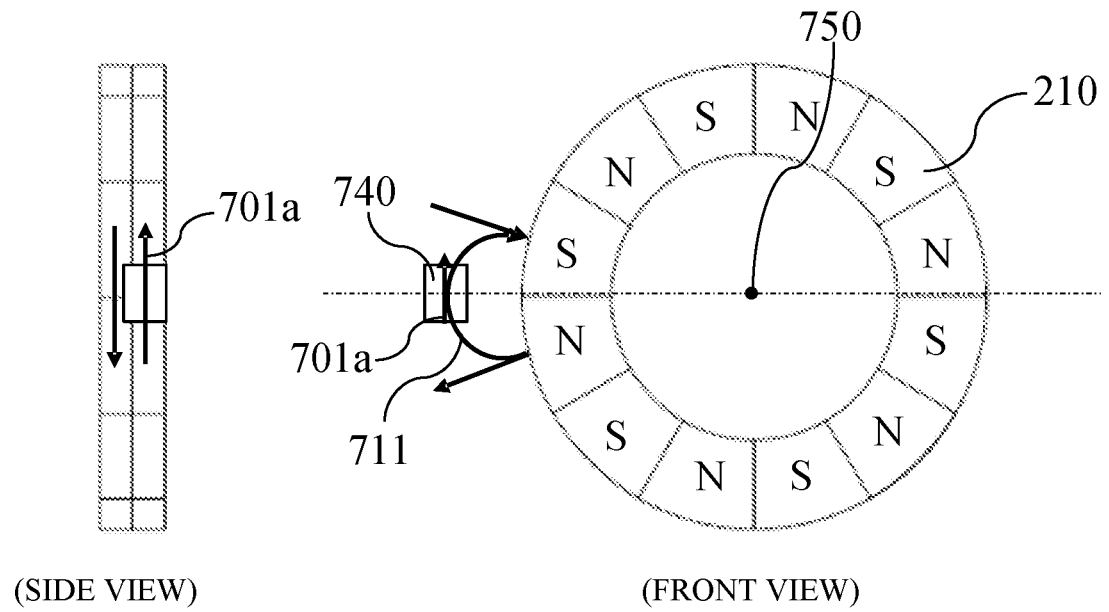
FIGS. 11A and 11B are diagrams each illustrating a positional relationship between the magnet and the detector according to the second embodiment.
Figure 11B:
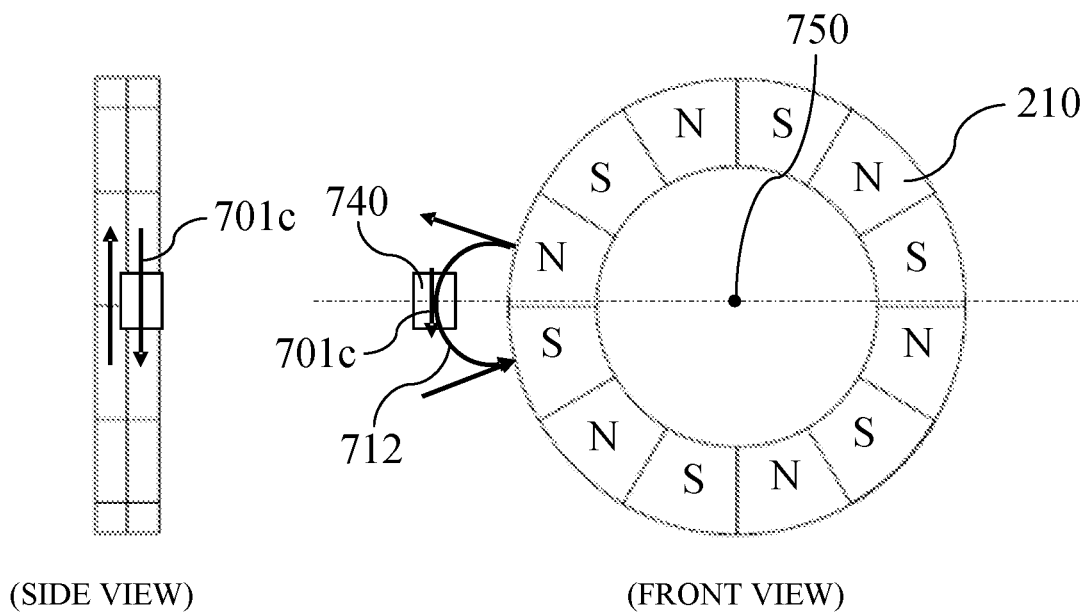

Next, with reference to FIGS. 11A and 11B, a description is given of the relationship between the magnet and the detector when the magnetic field 701 in the circumferential direction is detected. FIGS. 11A and 11B are diagrams illustrating a positional relationship between the magnet 210 and the detector. Here, only a magnetic field related to the detector is illustrated for simplification. Each of FIGS. 11A and 11B is views illustrating the positional relationship between the magnet and the detector and illustrates both a side view viewed from the radial direction and a front view viewed from the thrust direction according to a third angle projection method. A magnetic field in the circumferential direction is inverted into an opposite direction at the center in the thickness direction of the magnet 210. Therefore, as illustrated in FIGS. 10B and 10C, the magnetic field detecting component 740 is disposed so that its center is shifted to the thrust direction from the center in the thickness direction of the magnet 210.

FIG. 11A is a diagram illustrating the positional relationship between the magnet and the detector. The magnet rotates about the rotational axis 750. In FIG. 11A, a rotational phase is such that the magnetic field detecting component 740 faces a boundary between N and S poles of the magnet on the thrust direction projection plane. An arrow 711 represents a magnetic field heading from the magnet toward the detector. The magnetic field exiting the N pole passes through the magnetic field detecting component 740 as indicated by the arrow 711 and heads toward the S pole. Therefore, the detector detects a magnetic flux density indicated by an arrow 701a.

FIG. 11B is a diagram illustrating a state in which the magnet is rotated about the rotational axis 750 by 30 degrees for one pole from the state illustrated in FIG. 11A. On the thrust direction projection plane, the rotational phase is such that the magnetic field detecting component 740 faces a boundary between N and S poles of the magnet, and the positional relationship between the N and S poles is reversed from the positional relationship illustrated in FIG. 11A.

An arrow 712 represents a magnetic field heading from the magnet toward the detector. The magnetic field exiting from the N pole passes through the detector as indicated by the arrow 712 and heads toward the S pole. Therefore, the detector detects a magnetic flux density indicated by an arrow 701c. The arrow 701a and the arrow 701c are in the opposite directions, and the magnetic flux density repeats the direction change indicated by the arrow 701a and the arrow 701c for each rotation of one pole of the magnet.

As illustrated in FIGS. 11A and 11B, the detector is disposed at a position not overlapping with the magnet on the thrust direction projection plane. The detector can detect the magnetic flux density that changes with the rotation of the magnet and can detect a rotational direction and a rotational amount of the magnet.

Figure 12:
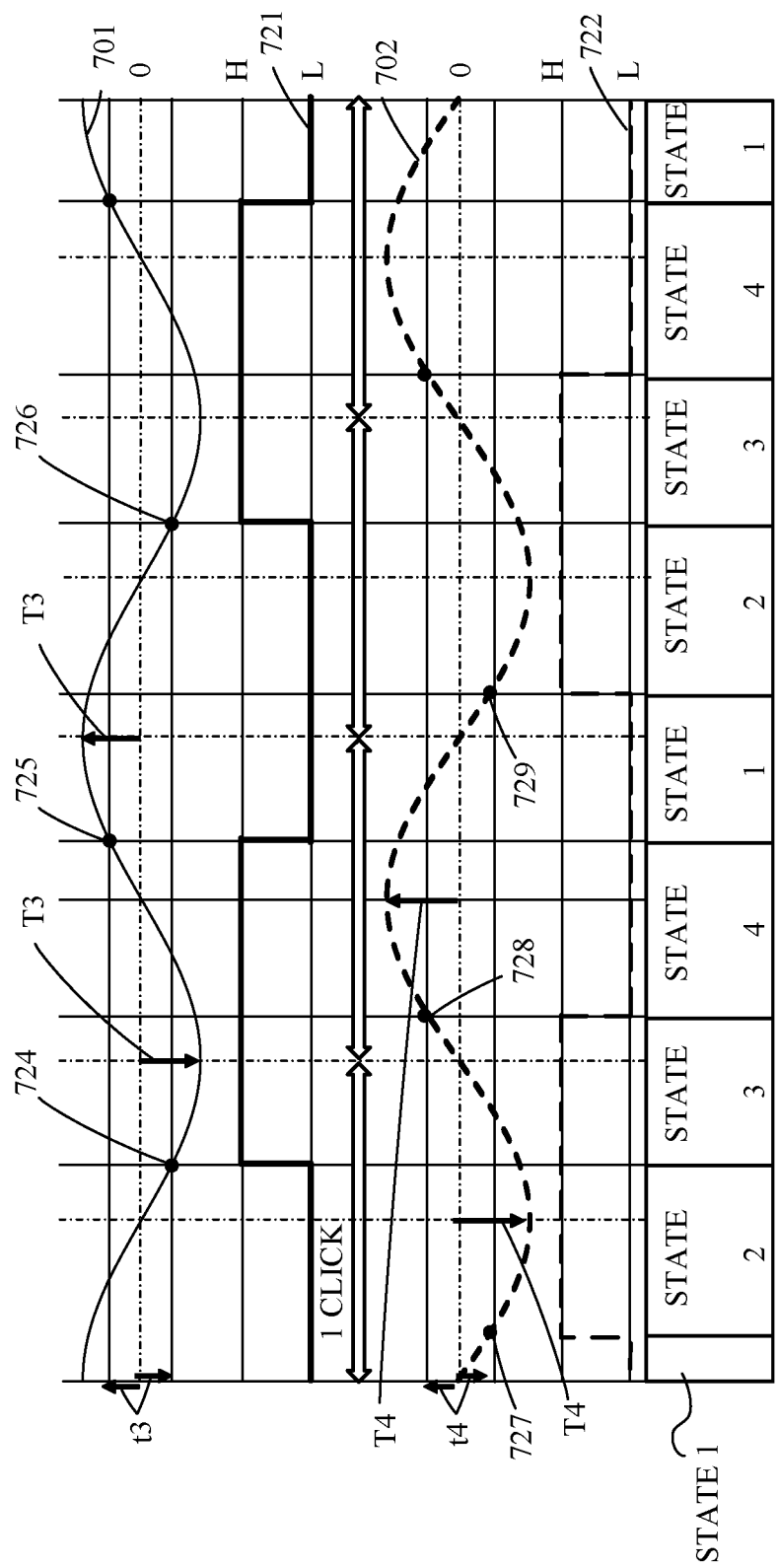
FIG. 12 is an explanatory diagram of clockwise rotation detection according to the second embodiment.
Figure 13:
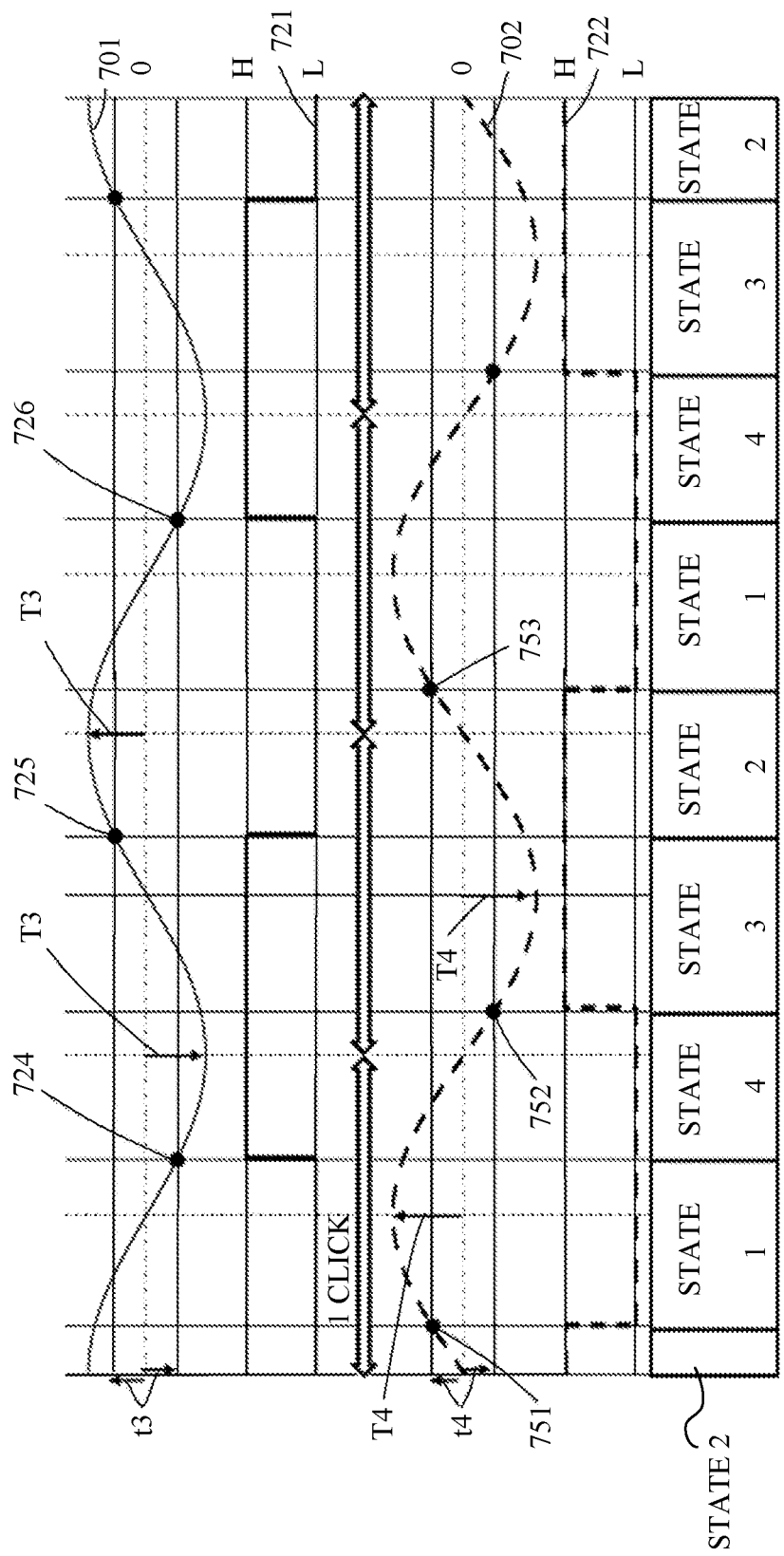
FIG. 13 is an explanatory diagram of counterclockwise rotation detection according to the second embodiment.

Next, with reference to FIGS. 12 and 13, a detailed description is given of changes in the magnetic field and output signals from the first magnetic field detector 741 and the second magnetic field detector 742 while the dial rotates. FIG. 12 is an explanatory diagram of clockwise rotation detection and is a graph illustrating a relationship between the magnetic flux density and output from the first magnetic field detector 741 and the second magnetic field detector 742 that have detected the magnetic flux density. A horizontal axis represents a rotational angle of the main dial 200. From the top, a vertical axis represents a magnetic flux density 701 in the circumferential direction at the position of the first magnetic field detector 741, a first detection signal 721 from the first magnetic field detector 741, a magnetic flux density 702 in the thrust direction at the position of the second magnetic field detector 742, and a second detection signal 722 from the second magnetic field detector 742.

The magnetic flux density 701 is a magnetic flux density in the circumferential direction detected by the first magnetic field detector 741 illustrated in FIG. 10A. The magnetic flux density 702 is a magnetic flux density in the thrust direction detected by the second magnetic field detector 742 illustrated in FIG. 10A.

The main dial 200 according to this embodiment generates the operational feeling by the magnetic attraction force between the magnet 210 and each of the first magnetic member 760 and second magnetic member 770, and a basic unit of the rotational operation on the main dial 200 is one click. In this embodiment, the rotatable operation member has twelve clicks and the number of the polarizations of the magnet is twelve, and FIG. 12 illustrates changes in the magnetic flux densities of 120 degrees (four clicks).

In the graph in FIG. 12, it is assumed that the main dial 200 is rotated clockwise at a constant speed from a left end to a right end of the graph, and as is clear from the drawing, each magnetic flux density changes periodically between a maximum value and a minimum value with zero as its center. In a state at the left end of the graph, the magnetic flux density 701 takes the maximum value of "T3". In the same state, the magnetic flux density 702 becomes zero.

When the main dial 200 is rotated from this state and becomes a state of rotated to ½ click, the magnetic flux density 701 becomes zero, and the magnetic flux density 702 takes the minimum value of "−T4". Further, when the main dial 200 is rotated and becomes a state of rotated by one click, the magnetic flux density 701 becomes the minimum value of "−T1" and the magnetic flux density 622 becomes zero.

As described above, when the main dial 200 moves by one click, the magnet 210 rotates by one magnetic pole, and each of the magnetic flux density 701 in the circumferential direction and the magnetic flux density 702 in the thrust direction change by ½ cycle. Further, the magnetic flux density 701 in the circumferential direction and the magnetic flux density 702 in the thrust direction are signals shifted by ¼ cycle. The magnetic field detecting component 740 makes it possible to acquire the rotational amount and the rotational direction of the main dial 200 by detecting the order and the number of times when these two signals exceed threshold values.

Here, the magnetic field detecting component 740 generally uses a method called an alternate detection type and changes the output value from H to L when the magnetic flux density exceeds the upper threshold. Further, once the magnetic flux density exceeds the upper threshold, the output value is maintained until the magnetic flux density falls below the lower threshold. Once the magnetic flux density falls below the lower threshold, the output value is maintained until the magnetic flux density exceeds the upper threshold.

In the graph illustrated in FIG. 12, it is assumed that the main dial 200 is rotated clockwise at a constant speed from the left end to the right end of the graph, and the output value at the left end indicates a state of clockwise rotation before the rotation illustrated in the graph. Specifically, at the left end, the first magnetic field detector 741 detects a state in which the magnetic flux density has exceeded the upper threshold of "t3", and therefore the first detection signal 721 becomes L. Then, in the first magnetic field detector 741, the first detection signal 721 becomes L from the left end of the graph to when the magnetic flux density falls below the lower threshold of "−t3" (at a point 724).

Next, in the first magnetic field detector 741, the first detection signal 721 becomes H from when the magnetic flux density falls below the lower threshold of "−t3" (at the point 724) to when the magnetic flux density exceeds the upper threshold of "t3" (at a point 725). Further, the first detection signal 721 becomes L from when the magnetic flux density exceeds the upper threshold of "t3" (at the point 725) to when the magnetic flux density falls below the lower threshold of "−t3" again (at a point 726).

On the other hand, at the left end, the second magnetic field detector 742 detects a state where the magnetic flux density has exceeded the upper threshold of "t4", and therefore the second detection signal 722 becomes L. Then, in the second magnetic field detector 742, the second detection signal 722 becomes L from the left end of the graph to when the magnetic flux density falls below the lower threshold of "−t4" (at a point 727).

Next, in the second magnetic field detector 742, the second detection signal 722 becomes H from when the magnetic flux density falls below the lower threshold of "−t4" (at the point 727) to when the magnetic flux density exceeds the upper threshold of "t4" (at a point 728). Further, the second detection signal 722 becomes L from when the magnetic flux density exceeds the upper threshold of "t4" (at the point 728) to when the magnetic flux density falls below the lower threshold of "−t4" again (at a point 729).

As indicated in a table of FIG. 12, combinations of the first detection signal 721 and the second detection signal 722 define a state 1, a state 2, a state 3, and a state 4. The state 1 is a state where the first detection signal 721 is L and the second detection signal 722 is L. The state 2 is a state where the first detection signal 721 is L and the second detection signal 722 is H. The state 3 is a state where the first detection signal 721 is H and the second detection signal 722 is H. The state 4 is a state where the first detection signal 721 is H and the second detection signal 722 is L. When the main dial 200 rotates clockwise, the detection state transitions in an order of the state 1, the state 2, the state 3, and the state 4 from the left end of the graph. Further, when the main dial 200 rotates clockwise, the rotational amount for one click is detected at a transition from the state 2 to the state 3 and a transition from the state 4 to the state 1. If there is a transition from the state 2 to the state 3 or from the state 4 to the state 1 within one click, a clockwise rotational direction is detected.

FIG. 13 is an explanatory diagram of counterclockwise rotation detection. In the graph of FIG. 13, it is assumed that the main dial 200 is rotated counterclockwise at a constant speed from a left end to a right end of the graph, and the output value at the left end indicates a state of counterclockwise rotation before the rotation illustrated in the graph. Specifically, at the left end, the first magnetic field detector 741 detects a state in which the magnetic flux density has exceeded the upper threshold of "t3", and therefore the first detection signal 721 becomes L. Then, in the first magnetic field detector 741, the first detection signal 721 becomes L from the left end of the graph to when the magnetic flux density falls below the lower threshold of "−t3" (at the point 724).

Next, in the first magnetic field detector 741, the first detection signal 721 becomes H from when the magnetic flux density falls below the lower threshold of "−t3" (at the point 724) to when the magnetic flux density exceeds the upper threshold of "t3" (at the point 725). Further, the first detection signal 721 becomes L from when the magnetic flux density exceeds the upper threshold of "t3" (at the point 725) to when the magnetic flux density falls below the lower threshold of "−t3" again (at the point 726).

On the other hand, at the left end, the second magnetic field detector 742 detects a state where the magnetic flux density falls below the lower threshold of "−t4", and therefore the second detection signal 722 becomes H. Then, in the second magnetic field detector 742, the second detection signal 722 becomes H from the left end of the graph to when the magnetic flux density exceeds the upper threshold of "t4" (at a point 751).

Next, in the second magnetic field detector 742, the second detection signal 722 becomes L from when the magnetic flux density exceeds the upper threshold of "t4" (at the point 751) to when the magnetic flux density falls below the lower threshold of "−t4" (at a point 752). Further, the second detection signal 722 becomes H from when the magnetic flux density falls below the lower threshold of "−t4" (at the point 752) to when the magnetic flux density exceeds the upper threshold of "t4" again (at a point 753).

As described with reference to FIG. 12, the combinations of the first detection signal and the second detection signal define the state 1, the state 2, the state 3, and the state 4. Therefore, when the main dial 200 rotates counterclockwise, the detection state transitions in the order of the state 2, the state 1, the state 4, and the state 3 from the left end. Further, when the main dial 200 rotates counterclockwise, the rotational amount for one click is detected at the transition from the state 1 to the state 4 and the transition from the state 3 to the state 2. If there is a transition from the state 1 to the state 4 or from the state 3 to the state 2 within one click, a counterclockwise rotational direction is detected. As described above, the state 1, the state 2, the state 3, and the state 4 can be defined by the combinations of the first detection signal 721 and the second detection signal 722. The transitions between these states are used for detecting the rotational amount and the rotational direction. According to this embodiment, it is possible to suppress an increase in the area occupied by the detector and to detect the rotational amount and the rotational direction of the main dial 200.

According to each embodiment, it is possible to provide a magnetic rotatable operation apparatus and an electronic apparatus having good dustproof and drip-proof performance.

In each embodiment, a description is given of the rotatable operation apparatus provided in the image pickup apparatus as an example, but the present disclosure is not limited to this, and the rotatable operation apparatus according to each embodiment can be also applied to a controller of a game machine, an in-vehicle operation apparatus, or the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-085803, filed on May 21, 2021, which is hereby incorporated by reference herein in its entirety.

What is claimed is:

1. A rotatable operation apparatus comprising:
a rotatable operation member configured to be rotatable about a predetermined axis;
a base member configured to rotatably support the rotatable operation member;
a magnet in which a plurality of magnetic poles are alternately magnetized and a magnetized direction of each of the plurality of magnetic poles is parallel to the predetermined axis, wherein the magnet has a ring shape and is configured to rotate about the predetermined axis as the rotatable operation member rotates;
first and second magnetic members arranged so that each of the first and second magnetic members faces a magnetized surface of the magnet and that the magnet is disposed between the first and second magnetic members;
a body frame configured to hold the base member; and
a detector configured to detect a change in a magnetic field caused by a rotation of the magnet,
wherein the first magnetic member includes a first tooth and the second magnetic member includes a second tooth,
wherein the rotatable operation apparatus is capable of generating an operation force according to a change in positions of the plurality of magnetic poles relative to positions of the first tooth and the second tooth, where the change in the positions is caused by the rotation of the magnet,
wherein the magnet, the first magnetic member, and the second magnetic member are housed inside the body frame,
wherein, in a view from a thrust direction of the magnet, the detector is disposed at a position that does not overlap with the magnet,
wherein the detector includes a first magnetic field detector and a second magnetic field detector, and
wherein the first magnetic field detector and the second magnetic field detector are configured to detect the magnetic field in a circumferential direction of the magnet and the magnetic field in the thrust direction of the magnet.

2. The rotatable operation apparatus according to claim 1, wherein, in the view from the thrust direction of the magnet, the first magnetic field detector is disposed on an extension in a radial direction of the first tooth of the first magnetic member and in a radial direction of the second tooth of the second magnetic member, and the second magnetic field detector is disposed on an extension in a radial direction of a valley portion of the first magnetic member and in a radial direction of a valley portion of the second magnetic member.

3. The rotatable operation apparatus according to claim 1, wherein the first magnetic field detector and the second magnetic field detector are disposed between the first magnetic member and the second magnetic member in the thrust direction of the magnet.

4. The rotatable operation apparatus according to claim 1, wherein, in the view from the thrust direction of the magnet, each of the first magnetic field detector and the second magnetic field detector is disposed on an extension of a valley portion of the first magnetic member and a valley portion of the second magnetic member, where the extension is in a radial direction of the magnet.

5. The rotatable operation apparatus according to claim 1, further comprising a substrate on which the first magnetic field detector and the second magnetic field detector are mounted,
wherein the substrate is disposed parallelly to the circumferential direction of the magnet.

6. The rotatable operation apparatus according to claim 5, wherein the first magnetic field detector and the second magnetic field detector are mounted on a surface of the substrate, where the surface of the substrate is opposite to a surface facing the magnet.

7. The rotatable operation apparatus according to claim 5, wherein each of the first magnetic member and the second magnetic member overlaps with a part of the substrate in the thrust direction of the magnet.

8. The rotatable operation apparatus according to claim 5, wherein the substrate is a rigid substrate disposed between the first magnetic member and the second magnetic member and is configured to function as a spacer between the first magnetic member and the second magnetic member.

9. The rotatable operation apparatus according to claim 5, wherein the first magnetic field detector and the second magnetic field detector are mounted on the substrate as one package.

10. The rotatable operation apparatus according to claim 1, wherein the first magnetic field detector and the second magnetic field detector are disposed at a position shifted from a center of the magnet in the thrust direction of the magnet.

11. The rotatable operation apparatus according to claim 1, wherein each of the first tooth and the second tooth is a comb tooth that radially extends from a center to an outer circumferential direction so as to face the plurality of magnetic poles.

12. The rotatable operation apparatus according to claim 1, wherein the magnet, the first magnetic member, and the second magnetic member are disposed on an opposite side of the base member from the rotatable operation member.

13. The rotatable operation apparatus according to claim 1, wherein the rotatable operation member can be operated in a plane parallel to the predetermined axis.

14. The rotatable operation apparatus according to claim 1, wherein a part of the rotatable operation member is exposed from the body frame.

15. An electronic apparatus comprising:
the rotatable operation apparatus according to claim 1;
at least one processor; and
at least one memory coupled to the at least one processor storing instructions that, when executed by the at least one processor, cause the at least one processor to perform operations including:
performing a predetermined process according to the rotation of the magnet.

16. The electronic apparatus according to claim 15, wherein the electronic apparatus is an image pickup apparatus configured to capture an image of an object.

17. A rotatable operation apparatus comprising:
a rotatable operation member configured to be rotatable about a predetermined axis;
a base member configured to rotatably support the rotatable operation member;
a magnet in which a plurality of magnetic poles are alternately magnetized and a magnetized direction of each of the plurality of magnetic poles is parallel to the predetermined axis, wherein the magnet has a ring shape and is configured to rotate about the predetermined axis as the rotatable operation member rotates;
first and second magnetic members arranged so that each of the first and second magnetic members faces a magnetized surface of the magnet and the magnet is disposed between the first and second magnetic members;

a body frame configured to hold the base member; and a detector configured to detect a change in a magnetic field caused by a rotation of the magnet, wherein the first magnetic member includes a first tooth and the second magnetic member includes a second tooth, wherein the rotatable operation apparatus is capable of generating an operation force according to a change in positions of the plurality of magnetic poles relative to positions of the first tooth and the second tooth, where the change in the positions is caused by the rotation of the magnet, wherein the magnet, the first magnetic member, and the second magnetic member are housed inside the body frame, wherein, in a view from a thrust direction of the magnet, the detector is disposed at a position that does not overlap with the magnet, wherein the detector includes a first magnetic field detector and a second magnetic field detector, wherein the first magnetic field detector and the second magnetic field detector detect the magnetic field in the thrust direction of the magnet, and wherein, in the view from the thrust direction of the magnet, respective tips of the first tooth and the second tooth are located at positions closer to the predetermined axis than an outer circumference of the magnet.

18. A rotatable operation apparatus comprising:

a rotatable operation member configured to be rotatable about a predetermined axis;

a base member configured to rotatably support the rotatable operation member;

a magnet in which a plurality of magnetic poles are alternately magnetized and a magnetized direction of each of the plurality of magnetic poles is parallel to the predetermined axis, wherein the magnet has a ring shape and is configured to rotate about the predetermined axis as the rotatable operation member rotates;

first and second magnetic members arranged so that each of the first and second magnetic members faces a magnetized surface of the magnet and the magnet is disposed between the first and second magnetic members;

a body frame configured to hold the base member; and a detector configured to detect a change in a magnetic field caused by a rotation of the magnet, wherein the first magnetic member includes a first tooth and the second magnetic member includes a second tooth, wherein the rotatable operation apparatus is capable of generating an operation force according to a change in positions of the plurality of magnetic poles relative to positions of the first tooth and the second tooth, where the change in the positions is caused by the rotation of the magnet, wherein the magnet, the first magnetic member, and the second magnetic member are housed inside the body frame, wherein, in a view from a thrust direction of the magnet, the detector is disposed at a position that does not overlap with the magnet, wherein the detector includes a first magnetic field detector and a second magnetic field detector, wherein the first magnetic field detector and the second magnetic field detector detect the magnetic field in the thrust direction of the magnet, and wherein at least one of a position in a radial direction, a position in the thrust direction of the magnet, and a detection threshold is different between the first magnetic field detector and the second magnetic field detector.

* * * * *